United States Patent
Gagas et al.

(10) Patent No.: US 8,872,077 B2
(45) Date of Patent: Oct. 28, 2014

(54) LOW PROFILE INDUCTION COOK TOP WITH HEAT MANAGEMENT SYSTEM

(75) Inventors: John M. Gagas, Milwaukee, WI (US); Scott A. Jonovic, Cottage Grove, WI (US); Richard C. Hochschild, Jr., Grafton, WI (US)

(73) Assignee: Western Industries, Inc., Watertown, WI (US)

( * ) Notice: Subject to any disclaimer, the term of this patent is extended or adjusted under 35 U.S.C. 154(b) by 1211 days.

(21) Appl. No.: 12/645,944

(22) Filed: Dec. 23, 2009

(65) Prior Publication Data

US 2010/0163549 A1 Jul. 1, 2010

Related U.S. Application Data

(63) Continuation-in-part of application No. 11/194,867, filed on Aug. 1, 2005, now Pat. No. 7,687,748, and a continuation-in-part of application No. 12/025,430, filed on Feb. 4, 2008, which is a continuation-in-part of application No. 11/232,050, filed on Sep. 21, 2005, now abandoned.

(60) Provisional application No. 60/888,080, filed on Feb. 3, 2007.

(51) Int. Cl.
*H05B 6/12* (2006.01)
*H05B 6/42* (2006.01)
*F24C 15/20* (2006.01)

(52) U.S. Cl.
CPC ............. *H05B 6/1209* (2013.01); *Y02B 40/123* (2013.01); *F24C 15/2042* (2013.01)
USPC ............ 219/623; 219/620; 219/622; 219/677

(58) Field of Classification Search
USPC ............ 219/620, 621, 622, 623, 677, 452.11, 219/676, 624, 627, 452.12, 632; 126/21 R, 126/21 A, 22, 218, 214 A, 211, 299 D, 299 R; 99/DIG. 14
See application file for complete search history.

(56) References Cited

U.S. PATENT DOCUMENTS 3,786,219 A 1/1974 Kornrumpf et al.
3,797,375 A 3/1974 Cerola
(Continued)

FOREIGN PATENT DOCUMENTS

EP 0951203 A2 * 10/1999
JP 6-267645 A * 9/1994
(Continued)

OTHER PUBLICATIONS

English Translation of JP 6-267645, Okada et al.; Sep. 1994.*

(Continued)

*Primary Examiner* — Henry Yuen
*Assistant Examiner* — Hung D Nguyen
(74) *Attorney, Agent, or Firm* — Boyle Fredrickson, S.C.

(57) ABSTRACT

An induction cook top may include a heat management system. The heat management system controls heat produced both internally by the electronic components within the cook top as well as heat produced above the cook top when cooking. The heat management system provides improved air flow past and around the internal electronic components. The cook top features an efficient removal of generated heat and may optionally provide a vented housing and direct airflow into and out of the housing or provide a thermoelectric cooling device which permits a ventless housing.

7 Claims, 27 Drawing Sheets

(56) References Cited

U.S. PATENT DOCUMENTS

| | | | |
|---|---|---|---|
| 3,883,719 A * | 5/1975 | Hurko | 219/466.1 |
| 4,013,859 A | 3/1977 | Peters, Jr. | |
| 4,100,964 A | 7/1978 | Gorechev et al. | |
| 4,114,009 A | 9/1978 | Kiuchi et al. | |
| 4,149,217 A | 4/1979 | Tucker | |
| 4,169,222 A | 9/1979 | Tucker | |
| 4,191,875 A | 3/1980 | Cunningham | |
| 4,206,336 A | 6/1980 | Cunningham | |
| 4,308,443 A | 12/1981 | Tucker et al. | |
| 4,396,818 A | 8/1983 | Kominami et al. | |
| 4,415,788 A | 11/1983 | Field | |
| 4,431,892 A | 2/1984 | White | |
| 4,446,350 A | 5/1984 | Mizukawa et al. | |
| 4,446,849 A | 5/1984 | McFarland | |
| 4,447,691 A | 5/1984 | Mizukawa et al. | |
| 4,453,067 A | 6/1984 | Karklys et al. | |
| 4,453,068 A | 6/1984 | Tucker et al. | |
| 4,490,596 A | 12/1984 | Hirai et al. | |
| 4,501,260 A | 2/1985 | Grace | |
| 4,511,781 A | 4/1985 | Tucker et al. | |
| 4,549,052 A | 10/1985 | Simon | |
| 4,562,827 A | 1/1986 | Cerola | |
| 4,603,684 A | 8/1986 | Kazuo et al. | |
| 4,665,893 A * | 5/1987 | Miyagawa et al. | 219/623 |
| 4,686,340 A | 8/1987 | Fukasawa | |
| 4,701,588 A | 10/1987 | Fukasawa | |
| 4,736,729 A | 4/1988 | Beach | |
| 4,750,470 A | 6/1988 | Beach et al. | |
| 4,757,177 A | 7/1988 | Suzuki et al. | |
| 4,766,880 A | 8/1988 | von Blanquet | |
| 4,784,114 A | 11/1988 | Muckler et al. | |
| 4,810,847 A | 3/1989 | Ito | |
| 4,833,288 A | 5/1989 | Poumey | |
| 4,846,146 A | 7/1989 | Tucker et al. | |
| 4,881,870 A | 11/1989 | Ritter et al. | |
| 4,886,046 A | 12/1989 | Welch | |
| 4,887,587 A | 12/1989 | Deutsch | |
| 4,899,028 A | 2/1990 | Arai et al. | |
| 4,908,489 A | 3/1990 | Panecki et al. | |
| 4,934,337 A | 6/1990 | Falk | |
| 4,945,891 A | 8/1990 | Cecil | |
| 4,951,646 A | 8/1990 | Diekmann et al. | |
| 5,000,160 A | 3/1991 | Dunlop et al. | |
| 5,001,970 A | 3/1991 | Graver | |
| 5,010,223 A | 4/1991 | Kim | |
| 5,062,410 A * | 11/1991 | Sarnosky et al. | 126/299 D |
| 5,111,014 A | 5/1992 | Tanaka et al. | |
| D327,538 S | 6/1992 | Falk et al. | |
| 5,119,802 A | 6/1992 | Cherry et al. | |
| 5,158,068 A | 10/1992 | Pickering | |
| 5,190,026 A | 3/1993 | Doty | |
| 5,209,217 A | 5/1993 | Beach et al. | |
| 5,213,091 A | 5/1993 | Beach | |
| 5,286,942 A | 2/1994 | McFadden et al. | |
| 5,370,576 A | 12/1994 | Krofchalk | |
| 5,376,775 A | 12/1994 | Lee | |
| 5,428,207 A | 6/1995 | Essig et al. | |
| 5,430,273 A | 7/1995 | Bogdanski et al. | |
| 5,446,268 A | 8/1995 | Chen | |
| 5,572,205 A | 11/1996 | Caldwell et al. | |
| 5,900,175 A | 5/1999 | Kicherer et al. | |
| 6,029,655 A * | 2/2000 | Hussong et al. | 126/515 |
| 6,198,080 B1 | 3/2001 | Rice et al. | |
| 6,202,638 B1 | 3/2001 | Didio-Sayer | |
| 6,236,024 B1 | 5/2001 | Gotz et al. | |
| 6,316,753 B2 | 11/2001 | Clothier et al. | |
| 6,320,169 B1 | 11/2001 | Clothier | |
| 6,444,958 B1 | 9/2002 | Campbell | |
| 6,528,770 B1 | 3/2003 | Akel et al. | |
| 6,528,772 B1 | 3/2003 | Graves et al. | |
| 6,555,794 B2 | 4/2003 | Leutner et al. | |
| 6,600,139 B2 | 7/2003 | Perschl et al. | |
| 6,630,650 B2 | 10/2003 | Bassill et al. | |
| 6,639,190 B2 | 10/2003 | Lerner | |
| 6,660,980 B2 | 12/2003 | Nagata et al. | |
| 6,660,981 B2 | 12/2003 | Ogata et al. | |
| 6,737,617 B1 | 5/2004 | Daum et al. | |
| 6,770,857 B2 | 8/2004 | Hirota et al. | |
| 6,809,301 B1 | 10/2004 | McIntyre et al. | |
| 6,821,628 B2 | 11/2004 | Schultheis et al. | |
| 6,828,530 B2 | 12/2004 | Boegel et al. | |
| 6,956,188 B2 | 10/2005 | De Rooij et al. | |
| 7,049,552 B2 | 5/2006 | Arntz et al. | |
| 7,049,563 B2 | 5/2006 | Keishima et al. | |
| 7,051,802 B2 | 5/2006 | Baer | |
| 7,081,603 B2 | 7/2006 | Hoh et al. | |
| 7,102,109 B2 | 9/2006 | Niiyama et al. | |
| 7,174,720 B2 * | 2/2007 | Kennedy | 62/3.3 |
| 7,423,244 B2 | 9/2008 | Baier et al. | |
| 2004/0006997 A1 * | 1/2004 | Clark et al. | 62/3.6 |
| 2006/0027561 A1 * | 2/2006 | Lee | 219/460.1 |
| 2007/0169770 A1 * | 7/2007 | Kuwamura | 126/211 |

FOREIGN PATENT DOCUMENTS

| | | | |
|---|---|---|---|
| JP | 2001196153 A * | 7/2001 | |
| WO | WO 2006051812 A1 * | 5/2006 | |

OTHER PUBLICATIONS

English Translation of EP 0951203, Blumenthal et al., Oct. 1999.*
English Translation of JP 2001-196153, Hosoi et al., Jul. 2001.*
*Designed for the Everyday Chef†, Induction Cooking Innovation from Kenmore®*, US.
*Research on Required Exhaust Flow Rate in Commercial Kitchens in the Case of Gas-Fired and Induction-Heating Cooking Equipment*, OSAKAGAS Technical Sheet, website ww.osakagas.co.jp/rd/sheet/061e.htm, Japan.
*Induction Cooktops*, Australian Consumer's Association website www.choice.com.au, Australia.
*The Induction Hob Class Induction Technical Training*, Brandt Customer Services Formation CU3-Induction-002UK-02/03, ElcoBrandt training manual, France.
*10-bit Rotary Encoder IC Supplants Optical Encoder*, Electronic Products 29$^{th}$ Annual Product of the Year Awards, Jan. 2005, US.
Flexpoint Flexible Sensor Systems Inc., Multi-Purpose Bend Sensors® product specification, US.

* cited by examiner

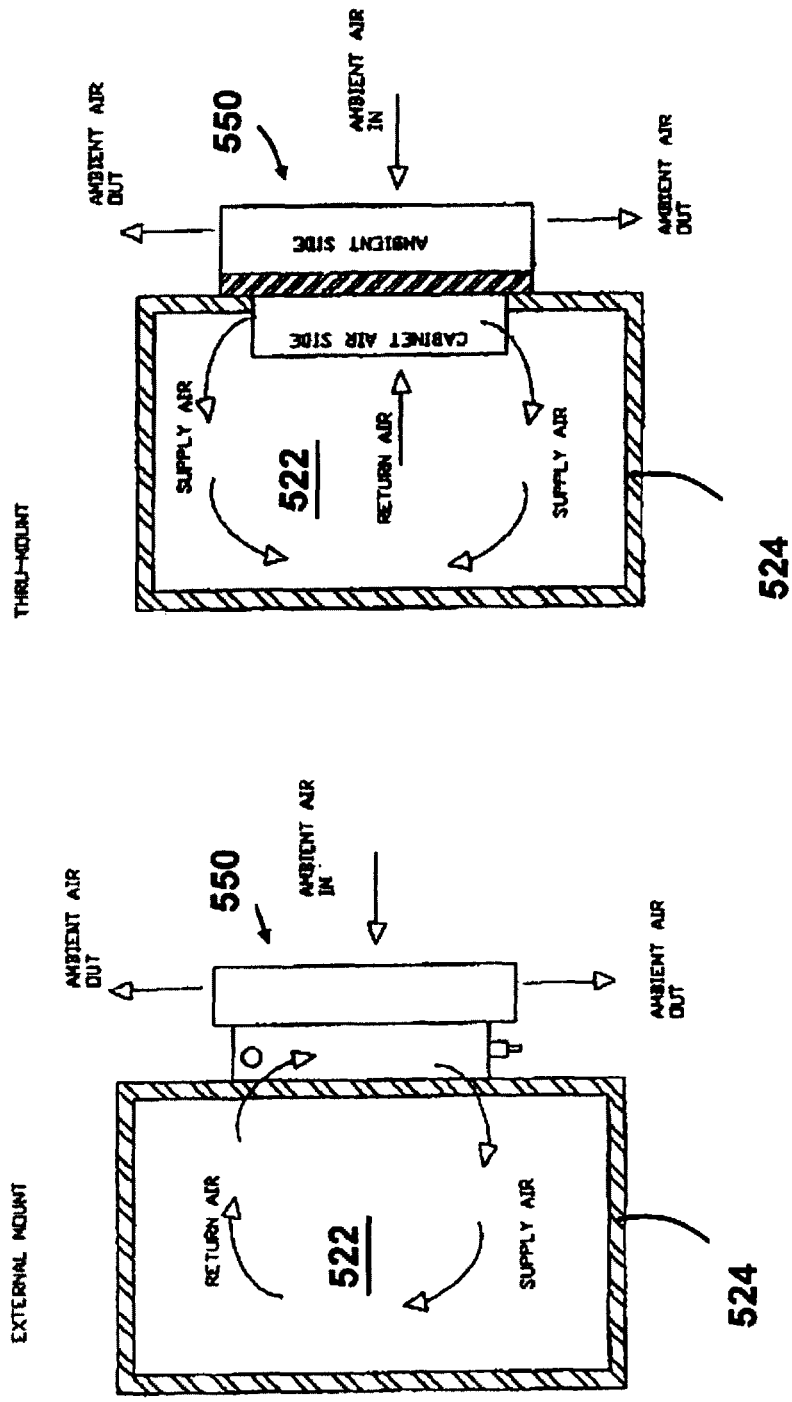

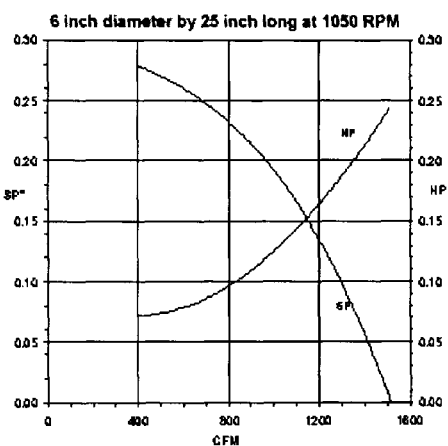
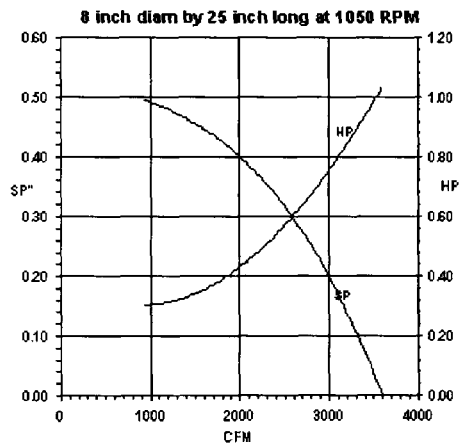
Table 1 shows a comparison betwee different diameter wheels.
FIG. 31
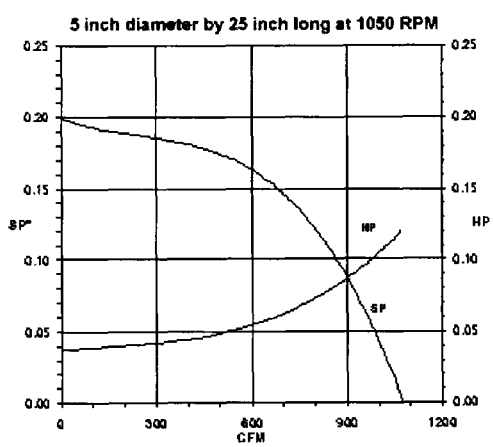
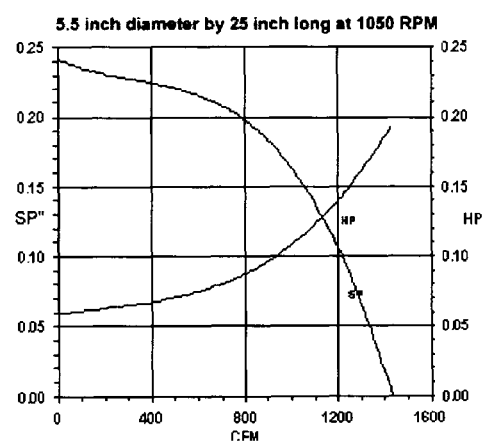
Table 2 shows a comparison betwee between different diameter wheel
FIG. 32

LOW PROFILE INDUCTION COOK TOP WITH HEAT MANAGEMENT SYSTEM

CROSS REFERENCE TO RELATED APPLICATIONS

This application is a continuation-in-part of and claims priority from U.S. patent application Ser. No. 11/194,867, filed on Aug. 2, 2005. This application is also a continuation-in-part of and claims priority from U.S. patent application Ser. No. 11/232,050, filed on Sep. 21, 2005. It is also a continuation-in-part of and claims priority from U.S. patent application Ser. No. 12/025,430, filed on Feb. 4, 2008 which claims priority to U.S. Provisional Patent Application Ser. No. 60/888,080, filed on Feb. 3, 2007.

BACKGROUND OF THE INVENTION

1. Field of the Invention

The present invention pertains to the art of induction cooking appliances and, more particularly, to an induction cook top appliance with a heat management system, such as a fixed or adjustable ventilator and an adjustable blower.

2. Discussion of the Related Art

Induction cooking, though long a favorite method of cooking in other parts of the world, has only recently become popular in the United States due to its high energy efficiency. Further, induction cooking is more efficient than gas or radiant heat because the cooking elements, i.e., electromagnetic coils, or hobs, are powered by induction generators that induce high levels of current in a pot placed on the cook top, thus heating the pot because of its high electrical resistance. The food or liquid in the pot is heated more quickly because very little heat is lost around the sides of the pot, i.e., the vast majority of heat is transferred directly to the contents of the pot.

Often, it is considered beneficial to utilize some type of ventilation system to evacuate the airborne contamination, either upward through a venting hood or downward into a draft flue. In kitchens, most known venting arrangements take the form of a hood which is fixed above a cooking surface and which can be selectively activated to evacuate the contaminated air. Downdraft vent arrangements are also widely known in the art wherein a cooking surface will incorporate a vent opening that is positioned between different sections of the cooking. During induction cooking, the heated pot may radiate heat down into the chassis or housing of the cook top, which can be of the drop in or slide in design as well as free standing. Often times, some type of internal ventilation system is used to evacuate the air in the chassis either upward through venting slots above the cook top or counter or downward into the cabinet.

The vertical distance between the cooking surface and a vent hood is typically fixed between 24 and 30 inches. When in an operating position, downdraft vent arrangements known in the art are also limited in this respect. Depending upon the food being cooked and even the particular height of the individual doing the cooking, it may be desired to vary the distance between the cooking surface and the vent hood. On a cooking surface, it is considered beneficial to arrange a vent closer to the cooking surface in order to increase the removal of contamination. On the other hand, it is often desirable to raise a vent hood relative to a cooking surface in order to more easily access different portions of the cooking surface. Typically, the internal components in the main housing are cooled by moving the heated air out of the housing. However, existing cooling systems do not account for the temperature of the incoming air, i.e., the systems are directed toward air removal from the inside the housing without considering the surrounding air temperature. Further, many existing systems re-circulate the previously expelled heated air back into the housing cavity, thereby increasing the temperature inside. This may result in elevated temperature levels in the housing that may cause component failure and/or reduced cooking performance.

Downdraft blowers are multiple speed fans, having a low speed and a high speed. Blowers are typically controlled by mechanical multi-position switches, potentiometer, or rheostat-type controls, which set the speed of the fan. For removal of normal cooking odors, steam, and other effluents and contaminates, low speed operations of the downdraft blower have been adequate. However, when using such items as a grill, a blower set at high speed has been better able to withdraw all of the grease-laden air from a kitchen and duct it to the outside environment. In cooking systems, such as cook tops and grills with optimized proximity ventilation, cooking gases, vapors, and odors are drawn into an exhaust inlet and are better exhausted into the atmosphere. Usually, the exhaust inlet is located adjacent the cooking surface and the inlet to a flow path which serially includes a plenum, a blower, an atmospheric exhaust, and interconnecting ductwork. The flow path to the atmosphere normally extends through a wall or floor of the room in which the cooking system is located, but can also be exhausted into a room, if filtered.

The blower/fan is frequently a separate unit from the rest of the cook top and is installed prior to the installation of the unit into a counter top. Some blower systems are provided with a pair of brackets, which permits the selective mounting of the blower to the floor or the appliance itself for discharge either through a wall or through the floor, as required by the installation. Conventional downdraft venting system configurations with an exhaust air inlet located at cook top level work well with electric surface units. However, when used in combination with gas on glass surface units, the downdraft-induced air flow at the cook top surface tends to interfere with the gas flame.

A cook top using induction heating for cooking purposes is normally constructed of a metal housing supporting a glass or other cooking surface upon which there is located a number of induction heating coils sandwiched in between. The housing normally contains an electronic package for use in supplying electric power to the coils. This package consists of a group of interconnected electronic components. The package is connected to the coils with wires that are mounted within the housing. This package is sometimes called the generator and the entire induction system is sometimes called a cooking cartridge.

Because of the heat generated by the induction coil package and the electronic circuitry for operating the induction coil, both of which are located below the cooking surface within the cooking cartridge, it is necessary to provide some form of cooling for the induction coil and its associated circuitry. The fan has been found to be the least expensive and most reliable cooling solution. The known drawback here, though, has been the sensitivity of the air flow, disruption of which causes failure or reduced energy for operation of the induction system.

In order to operate for a prolonged period without the induction system breaking down/turning off, it is necessary then to use a fan that circulates air throughout the interior of the cook top housing so as to maintain the proper temperature for the electronic components employed. Failure to keep the generator cool results in loss of power to the cooking product all the way to a complete unit shutdown. Normally, such a fan or blower is connected into the circuit used to supply power to the electronic components and, thus, is automatically turned on on each time the cook top induction element/generator is turned on. However, to avoid overheating, the fan remains on after shutdown of the cooking elements so that heated air within the cook top housing can be removed until a proper safe heat level is obtained.

While the use of a fan in this manner is desirable in preventing heat-caused damage to the electronic components employed, it is also considered a disadvantage. The use of a fan has two issues when used for cooling an induction cook top. When a fan is used in this manner, noise associated with the fan's operation is present whenever a cook top with induction of the type is used. Many users find this noise to be objectionable. Further, the use of a fan alone is considered a problem because if air flow is blocked, the unit must be completely shut down for safety reasons. However, a user does not take into consideration whether or not there is heat buildup present within a housing, rather only noting that the unit failed to operate.

Although it is possible to use other methods to keep the temperature down, e.g., by the use of thermostats and various related known temperature sensing apparatus for controlling the flow of current in an electrical circuit, it is known that such expedients are undesirable for any of a variety of reasons, including effectiveness, cost, and reliability.

It has also been shown that a particular air flow path may be helpful, e.g., whereby an internal fan draws cooling air directly into a cooking cartridge, across the induction heating components, out an opening in the bottom of the cartridge, and then exhausts the heated air above the cook top surface through a gap all around the cartridge between a support flange on the cook top surface. There also has been development of a modular cooking cartridge where the internal fan draws cooling air into the interior of the cooking cartridge through the cartridge top, over the induction heating components, and out through exhaust openings in the cartridge top by way of an air flow path, including an opening in the cooking cartridge container and an exhaust conduit formed by the cartridge container and an auxiliary housing fixed to the container.

As noted, many conventional cook tops often have integrated downdraft ventilators. Present designs are long rectangular boxes extending below the glass or metal cook top. They extend below the cook top housing as much as 30 inches below the surface or counter top. Attached to this box or plenum is the blower assembly extending outward from the box. The plenum does not, in some cases, provide any sealing to prevent the drawing of air from the box. Included in the typical downdraft assembly are: the blower housing assembly, squirrel cage housing assembly, centrifugal wheel, blower motor assembly, plenum chamber assembly, and a passage between the cook top and the plenum chamber for removal of air from the top surface of the appliance. The box is often of a single-walled or a double-walled construction, if you include the cook top box/housing with insulating air in between the plenum and cook top housing. An opening is provided to the interior of the box for exhausting. The centrifugal type fan/blower may be housed in the squirrel cage housing assembly and attached to the plenum. Such a single fan blower may also be attached to the side of the plenum with air flow at 90 degrees from the side of the plenum.

Blowers have been generally designed to draw air downwardly with the use of a centrifugal type fan, and thus remove contaminated air from a cook top surface, remove the interior air of the box, and exhaust it outside or return to the room. A centrifugal fan creates higher pressures than that of an axial flow fan. In such conventional systems, the air flow stream is pulled from the front and sides of the work area to the middle where the ventilator is. The air stream has to then turn 90 degrees downwardly, once inside the plenum chamber. The air stream has to then turn 90 degrees again into a small diameter opening when compared to the size of the ventilator's plenum chamber. The air stream then enters the blower flow efficiency and usually is redirected downwardly again for exhausting. With all this bending of the air stream, air is lost. Thus, large amounts of draw/vacuum/suction are needed to overcome all these losses. With the need for more draw/vacuum/suction comes a larger fan/blower motor, which increases costs, noise, size, and weight.

Present centrifugal fans consist of a wheel with small blades on the circumference and a shroud to direct and control the air flow into the center of the wheel and out at the periphery. The blades move the air by centrifugal force, literally throwing the air out of the wheel at the periphery, creating a vacuum/suction inside the wheel. There are two basic design types of wheel blades in centrifugal blowers—forward curved blades and backward inclined blades.

Forward curved wheels are operated at relatively low speeds and are used to deliver large air volumes against relatively low static pressures. However, the light construction of the forward curved blade does not permit this wheel to be operated at speeds needed to generate high static pressures. Thus, this type is generally not used in downdraft ventilators.

The backward inclined blade blower wheel design has blades that are slanted away from the direction of the wheel travel. The performance of this wheel is characterized by high efficiency, high cubic foot per minute (CFM) operation and is usually of rugged construction making it suitable for high static pressure applications. The maximum static efficiency for these types is approximately 75% to 80%. A drawback to this type is that it must be designed for twice the speed, which increases the cost of the unit.

To date, axial flow fans are not used for such cook top venting. Myths of why include: they cannot provide the static pressures needed for drawing/vacuum/suction, size, and spacing requirements. Axial flow fans come in three basic types of fans. The propeller fan (e.g., the household fan), the tube axial fan, and vane axial fan (cross flow or tangential). The first of these is the most familiar. The propeller fan consists of a propeller blade and a so-called "aperture" to restrict blowback from the sides. Without the aperture, the fan is not truly a propeller fan, since it cannot positively move air from one space to another. The aperture is usually sheet metal/plastic designed to fit closely around the periphery of the propeller. The tube axial fan (found in computers) is literally a propeller fan in a tube. In this case, the tube replaces the aperture. The tube axial fan generally increases flow quantity, pressure, and efficiency due to the reduced air leakage at the blade tips. The vane axial fan (cross flow or tangential) is a tube axial fan with the addition of vanes within the tube to straighten out the air flow. Here, the air flow changes from helical flow imparted by the propeller into a more nearly straight line flow and in the process increases the suction or draws pressure and efficiency while reducing noise. In general, the propeller fan operates at the lowest pressure. The tube axial fan is somewhat higher, and the vane axial fan supplies the highest-pressure output of the three. Vane axial fans are noted for use when available space for installation is limited, such as that of computers. Static efficiencies of 70% to 75% are achieved with vane axial fans. The CFMs and static performance ranges of the vane axial fan are similar to that of a centrifugal fan. Horsepower requirements are about the same for both designs.

The present downdraft ventilator designs also present problems when integrated into a cook top. Because of the low profile, spilled food and liquids can enter the grate, and removal of the items that are not captured by the filter cannot be removed easily. This is due to the required depth of the plenum and the narrow box size.

The present design of ventilators is also often large and bulky. Examples would be downdraft ventilators built into a cabinet or used on an island countertop. There, the space below the unit is not available for a user to use for storage due to the centrifugal blower below and the size of the plenum presently used. Large size also limits the downdraft ventilator from being placed in other areas or used with other products below the cook top. This also limits the downdraft ventilators from being used as a freestanding unit, as a mobile unit, used in a cabinet (e.g., suspended), or in areas that do not have the ability to support a large structural frame below.

A document from Osaka Gas Company entitled "Research on Required Exhaust Flow Rate in Commercial Kitchens in the case of Gas-Fired and Induction-Heating Cooking Equipment" illustrates some problems when using ventilators for removal of contaminated air. For example, with the use of induction heating cooking stoves, even a weak side draft caused the cooking contaminants to move outside the exhaust vent because there was not enough energy to raise the air up for the collection to take place. These results show that when induction-heating cooking equipment was used in a real commercial kitchen environment where the room air was disturbed, oil smoke or other cooking contaminants were not fully removed by the exhaust vent.

Present day induction coils are made to a critical temperature of 200° C. beyond which they undergo damage to the insulation between the wires. There have been attempts to do other things in the coils, especially at the center of the coil, by providing for a temperature sensor, for example, a thermistor, to prevent the overshooting of temperature limits. However, this type of localized sensor has very localized action and does not take into account the entire surface area of the generators/inductor. If the sensor does not work properly, there are situations in which the critical temperature may be reached and even exceeded causing damage. This is especially so when an empty pan is placed above the element supplied with current, or when food to be cooked has to be deep-fried. The results of these attempts ended with fans being added to keep the temperature in the proper operating range.

The prior art primarily is directed to controlling the operation of an internal electric fan for cooling the induction heating cooking apparatus, but it fails to address the flow of ambient air outside the housing.

The below-referenced U.S. patents disclose embodiments that were at least, in part, satisfactory for the purposes for which they were intended. The disclosures of all the below-referenced prior United States patents in their entireties are hereby expressly incorporated by reference into the present application for purposes including, but not limited to, indicating the background of the present invention and illustrating the state of the art.

For example, U.S. Pat. No. 4,549,052 discloses an internal cooling system for an induction cooking cartridge. This system includes an internal fan for cooling the various induction heating components. The cooking cartridge features an airflow that enters a mounting recess in at least two areas and enters at both the top and bottom of the cartridge cavity. The airflow is directed over the induction heating circuitry for cooling and is exhausted through the fan to an exhaust conduit. However, this system does not address the issue of the surrounding air intake and the temperature or quality of the air that is brought back into the housing for cooling.

U.S. Pat. No. 4,191,875 is directed toward controlling an internal electric fan for cooling an induction heating apparatus. It discloses a fan for circulating air through an induction cook top housing and maintaining the temperature of the electronic components. A thermistor is located near the induction heating apparatus and controls the operations of a fan. The speed of the electric fan is proportional to the degree of induction heating of the heating elements. The thermistor is in series with a variable resistor and a capacitor. When the capacitor is charged to a predetermined voltage through the thermistor and variable resistor, it will fire a signal through a component to allow current to flow through an electronic component and operate the fan motor. This system also includes a plurality of air inlets and outlet holes in the walls of the housing so that the fan randomly pulls air in one side and exhausts out the other side of the housing after passing over the induction heating apparatus. However, this system relies upon the critical factor that the airflow must be undisturbed in cooling.

U.S. Pat. No. 4,415,788 describes an induction cartridge having an internal forced air cooling system where a fan draws air into the cartridge cavity, circulates it around the induction heating components, and exhausts it out an opening in the bottom of the cartridge. This patent discloses exhausted air being returned to the kitchen environment through an exhaust gap around the periphery of the cartridge between the housing top and the bottom of a support flange. It is also stated that to protect the air stream, a separate drop in cartridge be made that isolates the induction elements from any other source of blockage. An induction hob cartridge contains a fan integrated into the hob assembly for cooling the electronics. The problem with this design is that the cartridge does not take into account the exhausted air or the air that is brought into the system. Specifically, the heated air is exhausted out the top edges and may be drawn back into the unit.

In another example, U.S. Pat. No. 4,431,892 discloses an induction cook top as a cartridge being fitted into a recess in a housing. The main innovation is an attempt to ventilate the interior of the cartridge using a ventilation system housed in the main body. The cartridge has openings on the side and top for air to pass through once connected to the holes in the down draft ventilator. However, this design is flawed because air that is drawn in will take the path of least resistance, i.e., the air would not be drawn effectively from the cartridge. Without proper air flow, the generator in the induction cartridge would overheat which may result in component failure or destruction.

In U.S. Pat. No. 4,100,964, an induction ventilation system featuring a liquid cooling system for removal of heat is disclosed. This system can be large, complex, and take up large amounts of space. Moreover, this system does not treat the incoming air. Thus, the exhausted heated air may be returned back into the cavity of the housing.

In U.S. Pat. No. 4,549,052, an induction hob cartridge contains a fan integrated into the hob assembly for cooling the circuitry. This system includes an internal fan for cooling the various induction heating components. The cooking construction has a unique air flow, which enters a mounting recess in at least two areas and enters the cartridge cavity at the bottom and the top. The air flow is directed over the induction heating circuitry for cooling and is exhausted through the fan to an exhaust conduit. This design does not take into account where the air is exhausted and the potential of drawing the exhausted air back into the cavity. Specifically, the heated air is exhausted out the top edges and may be drawn back into the unit if the exhausted air is not moved away from the intake vents for the cartridge.

Another approach to protecting the components within induction cooking was illustrated in U.S. Pat. No. 3,710,062. This invention includes a relatively complex thyristor gating circuit for precisely establishing the recharge period between conductive cycles of the inverter to cause the reapplied forward voltage across the thyristor to be insensitive to the loaded or unloaded condition of the work coil. However, it was found that this approach was incapable of protecting the inverter when loaded with a highly conductive utensil due to the heat buildup. A second circuit was illustrated in U.S. Pat. No. 3,775,577, which was included in the appliance based upon establishing a pedestal of predetermined length initiated by the start of a conductive cycle and assuring that commutation occurred within the period set by the pedestal. Again, issues still remained as to the cooling requirements needed with different types of loads.

Other known induction cooking appliances in prior patents, (e.g. U.S. Pat. Nos. 3,781,505 and 3,820,005) have attempted to protect the inverter by utilizing constant duty cycle controls for measuring the conductive interval of the inverter and adjusting the length of the recharge period to maintain an approximately constant duty cycle. As such, controls increase the operating frequency in response to a decreased conductive interval (as is normally caused by loading of the inverter) and they are not particularly suited to protecting the inverter from improper loads. In certain instances, presenting a highly conductive utensil to the work area causes a substantially shortened conductive interval, which, in turn, causes the constant duty cycle control to raise the operating frequency even higher, thus further aggravating the situation. The end result is increased temperature and the need for more air flow to cool the unit down.

Air flow systems have been generally utilized for control protection purposes in induction and other cook tops. For example, U.S. Pat. No. 3,859,499 discloses an air flow system for heat-cleaning ranges in which room air is drawn through air inlets located along the sides and top of an oven opening. The air passes through a space between the range's outer casting and the inner oven cabinet. A blower draws air into the upper air flow passageway during an oven heat-cleaning cycle. The blower exhausts air to the atmosphere through a vented splash panel.

Therefore, there exists a need for a state of the art indoor or outdoor induction cook top with heat management system to control the heat generated by the components, electronic controller, mechanical controls, or the induction generators, and to provide precise temperature control and efficient heat removal without drawing exhausted air back into the system. Further, there exists a need for an induction cook top having a smaller depth for ease of extraction and no venting above the counter. There exists a need for the user to be able to view/see the operation, functions, and view the codes on the cook top. There also is needed a new cook top construction such that can be used in limited spaces and places. Further, there is a need for a proper vent design so as to efficiently remove undesired heated air from the housing of an induction cook top appliance. There is also a need for controls to be less susceptible to the environment. Additionally, there is a need for a remote control, a need to accurately apply and control heat output as it is returned to the room, and a need for a new design that can be used in a variety of places and spaces.

SUMMARY AND OBJECTS OF THE INVENTION

The present invention relates to an indoor or outdoor induction cook top with a heat management system that preferably a) controls the heat generated by, e.g., the electronic controller, mechanical controls, and the induction generators, as well as the radiated heat for the cooking, and b) provides precise temperature control, efficient removal of heated air, and of improved air flow through the system. More particularly, this invention relates to an improved induction cook top having better accuracy in removing heated air and directing airflow with precise control of ventilation functions/operations in built-in, mobile, or modular appliances. Sensors may also be utilized to provide users with information pertaining to system conditions, e.g., the temperature in the housing. The induction cook top of the present invention further provides greater efficiency and lower noise levels.

In accordance with one aspect of the invention, an induction cook top appliance comprises a cooking surface attached to a housing, wherein the housing has an intake opening and an exhaust opening, an inductor coil in the housing, an induction generator operatively connected to the induction coil, a fan for moving air through the housing, an electronic control system that controls the fan, and a barrier system attached to the housing that is configured to prevent heated air that passes through the exhaust opening from being drawn back into the housing through the intake opening.

In accordance with another aspect of the invention, an induction cook top appliance comprises a housing, a cooking surface having at least one bracket or frame member connected to a bottom side of the cooking surface to attach the cooking surface to the housing, an induction coil in the housing and below the cooking surface, an induction generator operatively connected to the induction coil, an electronic cooling device, and an electronic control system in communication with the electronic cooling device.

In accordance with yet another aspect of the invention, the induction cook top appliance may include at least one additional induction coil in the housing and below the cooking surface and at least one additional induction generator. Each additional induction generator is operatively connected to one of the additional induction coils. Preferably, each of the induction generators and induction coils are packaged in an induction unit assembly. The electronic cooling device may comprise a fan and a heat exchanger operably connected to the induction unit assembly.

Additionally, the invention may include a metal plate extending generally parallel to the cooking surface and configured to support the induction coil, a fan connected to either the metal plate or the electronic cooling device, and a fan cover extending below a lower surface of the housing and extending generally around a periphery of an air intake positioned in the lower surface of the housing. A gasket may also be included around the periphery of the air intake. The housing may include multiple bosses extending from the housing toward the metal plate. The bosses are spaced around the periphery of the housing and engage the metal plate such that a cooling air gap between the housing and the metal plate is formed between successive bosses.

As yet another aspect of the invention, the electronic cooling device may be a forced convection cooler, an electronic heat sink, a thermoelectric cooling device, a cold plate, a copper spreader, multiple electronic heat pipes, or multiple thermal vias. In addition, a fan may be included to draw air across the electronic cooling device. Preferably, the electronic cooling device is a thermoelectric device, for example, a solid-state heat pump that utilizes the Peltier effect to provide cooling, having a first side mounted within the housing and a second side mounted outside the housing. The cook top appliance may include a closed loop temperature controller providing at least one signal to the thermoelectric device to regulate the temperature within the housing. The thermoelectric device may be sized to provide sufficient cooling within the housing such that no venting from the housing is required.

Optionally, the housing may be vented and include an opening extending through a lower surface of the housing and at least one vent extending through a side of the housing. A fan may be connected to draw into the housing through an opening in the lower surface of the housing and to expel the air out through the vent in the side of the housing. An element may be connected to the lower surface of the housing and positioned between the side of the housing having an exhaust vent and the opening in the lower surface of the housing. The element directs air flow from the vent in the side of the housing to prevent the air from returning to the opening in the lower surface of the housing. The element may be pivotally connected to the lower surface of the housing such that it may lay generally flat against the lower surface or rotate downward such that it hangs generally perpendicular to the lower surface.

It is still another aspect of the invention that a cook top appliance comprises a housing having an upper surface, a lower surface, and a plurality of side surfaces. At least one bracket or frame member is affixed to the upper surface to connect the upper surface to the plurality of side surfaces. The cook top appliance further includes a touchpad controller operably connected to the upper surface, multiple cooking surfaces arranged on the upper surface of the housing, and multiple heating elements. Each heating element is positioned below one of the cooking surfaces. In addition, a metal plate extends generally parallel to the upper surface and substantially between each of the side surfaces. The metal plate is configured to support the heating elements. The cook top appliance also includes an insulation layer positioned below the metal plate and extending substantially between each of the side surfaces, a fan connected to the lower surface of the metal plate, a fan cover extending below the lower surface and extending generally around a periphery of an air intake passing through the lower surface, and a gasket extending substantially around the periphery of the air intake. A plurality of bosses protrudes into the housing from the side surfaces at a height on the side surfaces that is generally in line with the metal plate.

As another aspect of the invention a cook top appliance comprises, a base, a first and a second induction heating element affixed to the base, and a cooking surface affixed to the base generally above the first and second induction heating elements. The base, first and second heating elements and the cooking surface all form an integrated unit. The cook top appliance also includes a ventilation passage communicating air through a cavity in the base containing the induction heating elements and an element supported by the base and oriented to control air flow from the ventilation passage. The element may be positioned within the base and be shaped to direct the air flow towards the heating elements. Optionally, the element may be connected to the lower surface of the housing to substantially prevent the air expelled from the base from returning to an intake opening of the ventilation passage.

In accordance with a still further aspect of the invention, the induction cook top appliance includes 1) a regulator to control electrical current to each of the heating elements such that the power output can be changed as needed, and 2) a fan to reduce heat buildup. The induction cook top appliance may further include a vent passing through the cooking surface for removing hot air above the cooking surface. A plenum may slidably pass through the cook top vent and a heat management system may regulate the air from above the cooking surface independently of the air passing through the ventilation passage.

Additionally, the invention may include one or more fans for moving air throughout the housing and/or for moving heated air away from the housing. Further, the invention may include a housing that is sealed to substantially prevent air from escaping the housing.

The inventive system may be of a fixed or of a telescoping ventilator integrated into the smooth glass ceramic induction cook top for removal of contaminated air. The system can also incorporate a cross flow or centrifugal blower system for the source of air removal device. The induction cook top with integrated downdraft or telescoping ventilator using cross flow or centrifugal blower may be combined with other counter top range items in the house thus reducing the need for an over-the-head (updraft) type ventilator, and increasing space below.

Such a system may be incorporated into a cook top/grill, built into a range, or other appliance, and has a single to a plurality of induction/inductor heating elements located on a counter, range, or other surface. However, this inventive system may also be used in combination with gas or electric-type heating elements found on appliances. The ventilator preferably includes a base housing or plenum and cross flow assembly. The base housing is attached to a cook top or other surface and is preferably permanently fixed. The plenum is only the depth of a cook top housing member and is preferably sealed to the glass/metal. The invention preferably incorporates a keypad and control circuit, which enables adjustment of the fan speeds and sensors. The control of the ventilator may be integrated into present controls, located on the cook top, remotely located, or parts of the keypad/control may be split between the ventilator and other locations. The controls may include an electronic control board that may be located on the cook top, or remotely, or parts of the electronic control board may be split between the cook top and other locations. The control board also preferably determines that a stop/obstruction is present by the increase in current, air flow, voltage, or resistance, and accordingly adjusts or turns off the power supply.

The present invention induction cook top with integrated downdraft or telescoping ventilator using cross flow or centrifugal blower technology assembly preferably includes a cook top housing assembly, a cross flow blower assembly, a ventilation system, a ceramic glass cook top, an opening for the vent or downdraft, and a filter. The cross flow blower assembly is composed of a motor item, fan wheel/blades, and a blower housing preferably attached to an air passage in the induction cook top housing. These items, motor, fan wheel, and housing may be one assembly or may be made so as to be separate components integrated into a plenum. Seals are provided for sealing the space between plenum or base housing and walls in the passage created by the cook top housing. The seal also makes contact with the vent or grate member to provide sealing on the cook top. It is also important that the sealing provide a barrier to the air flow so as not to disrupt the cooling air to the induction generator in any way. This provides for better air loss control and reduces side air removal. This method need not use the double wall construction used in centrifugal types for the inner or base housing as the plenum which is now part of the cook top passage and the cross flow blower is preferably attached to the cook top housing. This single box design reduces the cost of manufacturing. A centrifugal-type blower assembly may also be used.

A cross flow blower assembly may be used as long as the surrounding surfaces can take the air movement and not be interfered with. Air moves down the passage of the cook top lower housing to the blower assembly from an opening in the glass ceramic or cook top surface. The advantage to using this method is that the base plenum housing is eliminated and the need for sealing from the base plenum housing to the cook top member is eliminated.

It should be noted that the downdraft ventilator may consist of multiple cavities or compartments in the same appliance or multiple fans/blowers and that the invention may be built into/on a mobile island or cart for use with grilling/cooking equipment. A mobile unit is preferable so one does not need to have it installed into/on a cabinet or structural or supporting frame and thus there is now space below for use by the user.

From a design standpoint, anyone skilled in the art will be able to see the construction of the present invention being a smooth glass/ceramic glass/metal, etc. induction cook top with a ventilation system that will not affect the needed air flow for cooling the induction generators, electronics, and space. Because of the invention's constructions, methods, and designs, one may have nearly limitless designs, features, appearances, elevations, styles, operations, sensing, and performances for both fixed and telescoping downdrafts. With the ability to properly seal/isolate the ventilator from the induction generator's air flow, one can have great flexibility in ventilator shapes, and in where the downdraft may be placed, as well as different looks, which will afford users the advantages and benefits offered by other products.

With reference to the present invention, also included is a fan/blower. Preferably, this represents the cross flow/tangential fan/blower assembly. In accordance with this invention, there are a number of fans/blowers that can replace or add to the style shown. Fans/blowers for replacement or addition come in many shapes and sizes and may be formed and bent into nearly any shape. These fans/blowers may be located along/on the induction cook top's housing or any other surface. Using a fan/blower improves air removal throughout the inside cavity. The use of two or more fans/blowers can be used to improve on the air removal in the inner cavity and exhausting. See, e.g., FIG. 4. The use of a variety of electronics and controls for the blower may also greatly improve on the removal of contaminated air. Greater control means less flow loss and fan noise and smaller overall blower size. Preferably, the assembly of a fan/blower assembly is comprised of a housing, fan, and motor assembly with bearings to support the fan and motor on the housing.

Blower/motor specifications can significantly influence the performance and reliability of cooking units. First, placing the blower assembly as close to the items on a cook top location as possible increases the effectiveness of drawing contaminated air in and out. Second, reducing the number of bends the air has to flow around helps reduce air flow losses. Also, a cross flow blower does not need the air stream to change directions as does a centrifugal-type fan/blower. Further, using a cross flow blower increases in effectiveness, and thus permits the size of the blower/motor to be reduced. Thus, the noise level is reduced. Long-wheeled cross flow blowers and tangential blowers provide other advantages including wide uniform air flow over the width of the unit without gaps, uniform air delivery for high capacity, geometry that results in a significantly quieter blower/fan, and a smaller profile for the same length of exterior housing. Good speed control of such blowers may be achieved by using resistors, regulating transformers, and electronic controllers for voltage regulation. Other advantages include the ability to design for overload protection, no warming of the air as the motor is situated outside the air flow, longer bearing life, and higher efficiency. The energy saving from not having to turn on a large blower motor provides added benefits to the user in the way of cost saving. Another added benefit is a lower profile so that there is more useable room under a range/cook top or in a cabinet. The fan may be used for not only ducting heated air and effluent but also moisture.

The present invention preferably includes a control board and related circuitry to control power/control to the motor, control to the fan(s)/blower(s), and control to an electronic controller, glass touch pad, or mechanical controls. Controls can be built with power control to sensors. AC or DC power supplies the electronic current to the board and other components. As mentioned, the control board can be located on/in the cook top or remotely. It can also be divided into more than one board and located at different locations. The electronic board also can use the flex technology, which permits the board to be or bend into any shape. There are a number of types of controls that may be connected to the board. For example, one control may have a real or simulated mechanical look with electronics below and a knob for turning on the top. Also, a rotary encoder for high precision sensing and control, such as the position detection, may be present for control at different heating levels.

With reference to the present invention, a passage in the cook top housing preferably provides for a filter. While typically found in the opening called plenum, there are a number of ways to attach filters including attaching the filter into a recess in order to lock the filter in place, snapping into or dropping into place, or using a filter tray.

A flow sensor may be used with the filter for the detection of air flow. Such a sensor improves on the efficiency and required servicing of the filter. A flow sensor in, on, or behind the filter area and communication with the electronic control board preferably detects the movement or reduced movement of air passing by the sensor. This air movement may have set limits as to when the filter needs changing. These limits can be adjusted for the type of filter used, which may be metal mesh, louver, carbon, or a combination of these types. A different way is to have the electronic control board set the limits automatically based on percentage of blockage.

Other sensors for air flow may include the simplest and lowest cost types such as a strain gage on a reed, in which the air moving across the reed bends the reed causing the strain gage to send a signal to a sophisticated electronic control board system. In such a system, as the air is reduced, the signal changes and the electronic control board signals the user to change the filter. Signaling the user may be by sound or by lights or other methods such as the system not operating or combinations of signals. Another low cost method is by magnetics. This would be very similar to the one above, but would be based on detecting a magnetic gain or loss. Another sensor type is a differential pressure sensor, which has one open end on the outside of the filter and the other side behind the filter. The difference between the sensor openings can be signaled to the electronic control board, which then can watch for the changes either up or down and then, when a set point is reached, signal the user for change. The microbridge mass air flow sensor is another sensor which operates on the theory of heat transfer. The other types of possible sensors are solid state Hall effect sensors, piezoresistive sensors, calibrated pressure sensors, transducers, bonded element transducers, transmitters, and ultrasonic, Doppler, IR, and fiber optic sensors.

With the present invention, it is also desirable to better regulate the electrical current to the cross flow/tangential fan(s)/blower(s) such that the power output can be increased or reduced with improved accuracy, and similarly increasing or decreasing the speed output from the cross flow/tangential fan(s)/blower(s) with greater accuracy. Determining the needed air flow loading for the inner member cavity and only supplying that amount of power, may be done with electronics. This method may provide an energy star rating and improved energy use.

Another aspect of the present invention is to have a nearly infinitely selectable speed fan adjustment range. This can be done, for example, by having the user touch down on a glass resistance keypad until the speed required is reached. Once the required speed is reached, the electronic control board may completely cut off current/power to the blower(s)/fan(s) slowing or stopping the user's speed adjustments. The keypad may have one or two keypad locations for operating up or down the speed by the user. Using two or more locations for independent operations can provide the user better control by being simple. The use of a display to show user the speed level may assist in finding proper speeds, which then can be programmed into the electronic control board for repeated operations later.

Sensors may be used with the electronic board to optimize system operation. These include current sensors to monitor AC or DC current, adjustable linear, null balance, digital, and linear current sensors, and magnetoresistive, closed loop current and digital current sensors, as well as a variety of others.

The present invention may also include the ability to supply a fresh stream of air up the sides or back of the downdraft ventilator, thus providing a supply of burnable air for a gas cook top, which has been a problem with present units due to the blocking by the ventilator. The air is preferably ducted out the bottom or along the sides or back of a downdraft ventilator tapping of the vented air, and returns the air at the bottom of the grate to the cooking area.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 19 is a view of an airflow pattern in an embodiment of the invention featuring an externally mounted electronic cooling device;

FIG. 20 is a view of the airflow pattern in an embodiment of the invention featuring a through-mounted electronic cooling device;

Figure 1:
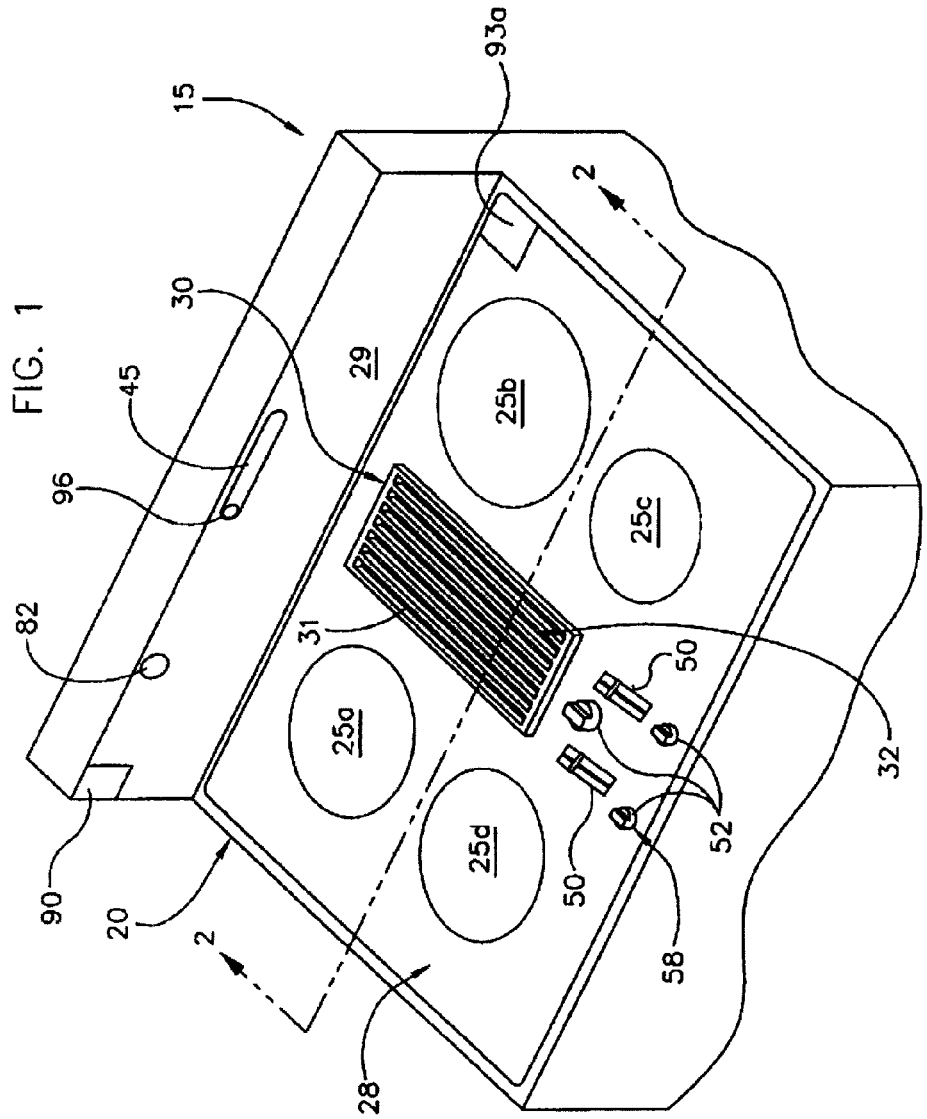
FIG. 1 illustrates a perspective view of the appliance of the present invention.

In describing the preferred embodiments of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto, are often used. They are not limited to direct connection but include connection through other elements where such connection is recognized as being equivalent by those skilled in the art.

Further, before any embodiments of the invention are explained in detail, it is to be understood that the invention is capable of other embodiments and of being practiced or of being carried out in various ways. Also, it is to be understood that the phraseology and terminology used herein is for the purpose of description and should not be regarded as limiting. The use of "including," "comprising," "at least one of," or "having" and variations thereof herein is meant to encompass the items listed thereafter and equivalents thereof as well as additional items.

DESCRIPTION OF PREFERRED EMBODIMENTS

The present invention and the various features and advantageous details thereof are explained more fully with reference to the non-limiting embodiments described in detail in the following description.

Note that the detailed description that follows the drawings which are used, does not show all the details of every product described, but only certain features of the invention that aid in describing the invention. One skilled in the art will see the benefits of this new invention and know of all the other methods of construction and design.

1. System Overview

The present invention relates to an indoor or outdoor induction cook top having a heat management system and system heat control. Briefly, this is accomplished by providing an induction cook top with a system to control and efficiently remove the heat generated by the electronic controller, mechanical controls, and the induction generators of the cook top while also providing precise temperature control and an efficient way of removal of heat. Further, also disclosed is a cook top having a closed system, e.g., wherein the housing is sealed to substantially prevent air from escaping the housing. The inventive induction cook top can be combined with other counter top range items in the house such as a mobile unit, an island unit, a fixed location unit, a drop or slide in cook top, and/or a grill. In such units, the cooking surface is preferably glass.

With the increasing heat dissipation from induction devices and the reduction in overall form, thermal management has become a much more important element of electronic product design in induction appliances. Both the performance reliability and life expectancy of the induction cook tops are inversely related to the component temperature of the equipment. The relationship between the reliability and the operating temperature of an induction generator and the electronic controls devices shows that a reduction in the temperature corresponds to an exponential increase in the reliability and life expectancy of the devices. Long life with increased reliable performance of a component may be achieved by effectively controlling the device operating temperature within the limits set for these components.

The vent preferably comprises a vent cover for covering a vent hole. In one embodiment, the vent preferably includes a telescoping downdraft. The vent or ventilator is preferably operably connected to the cooking surface for drawing air and effluents therefrom and has an inner cavity and a plenum. The plenum preferably has walls surrounding a chamber. In other embodiments, the ventilator folds, slides, or retracts. The vent may include an actuator-driven venting system having at least one of a motorized, electromagnetic solenoid, and powered venting control. Such electronic exhausting controls are preferably in communication with the vent. These controls may be used to, for example, close a flap or door to the vent when not in use. In one embodiment, these controls are integrated with those of the induction hob and the blower. The downdraft has a shape that may be rounded, squared, oval, triangular, and/or rectangular.

The blower assembly preferably includes one of the following: a system that manages air and effluent from the cook top and cooling air from the induction heating element, a regulator for electrical current to a blower motor such that the power output can be changed as needed, a tangential fan to circulate air downward, a cross flow fan, a centrifugal fan, a fan that can be remotely located in attached duct work, a fixed speed fan, a variable speed fan to control air movement, a squirrel cage wheel fan, a fan with adjustable speeds that may be preset, a fan used as a power vent for removing air, a fan for management of moisture buildup and controlled by a humidity sensor, a re-circulating system, a mechanism for sucking air from the appliance top, a fan for management of heat buildup and controlled by a heat sensor, a large chamber plenum assembly, and a fan to move air through a heat exchanger. The blower has an AC or DC motor. The fan may include blades of straight or skewed design and a long length axial wheel. Preferably, the appliance's blower operation is synchronized with the operations of the induction hob and its cooling system.

A controller is preferably present to control the appliance, e.g., operations such as ventilator movement, element heating, etc. In one embodiment, the controller is preferably an electronic controller to control blower speed. Such an electronic controller includes at least one of a touch device, a keypad, a slide, and a knob. The keypad controller may be located on the cook top, located remotely, split into parts between the top and another location, or matched to a size, appearance, and function of another neighboring appliance and the cook top. The controller includes an electronic control panel having at least one of a piezo, tactile, membrane, inductive, capacitance, and resistance device. The panel is constructed from at least one of glass, metal, plastic, wood, and composite substrates. The controller is at least one of a piezo, capacitance, and resistance-type touch control keypad for use with any size appliance, a membrane switch, a tactile, resistance, inductive, capacitance control with decorative overlays, labels, or trim, and a complete control panel assembly. The controller is preferably installed in a plane relative to the cooking surface and may be flush, raised, recessed, and remotely located. The controller may have an integrated control board. The board may be in at least one of the following locations: on the cook top, remotely, and/or split into several parts between the cook top and other locations and attached thereto. The circuit board may also include a microcontroller, an IC, a driver, a PC board, a processor, and a power controller in communication with the electronic controller.

In another embodiment, the controller is a remote control for wireless control of an operation. A device may be provided for making such a controller at least one of automatic with no user interface, semi-automatic with a limited user interface, and/or completely manual with the user setting, operating, and adjusting the system or parts thereof. As such, the controller may also include a programmable controller to monitor at least one of temperature, operations, speed, time, blower efficiency, lighting, and air movement.

In another embodiment, a sound-activated control is used to control at least one operation of the appliance. A computer system including a full memory and processor may also be used for connecting the appliance to a whole house system. A display interface may also be available with the controller to help the operator with the functions, temperatures, speeds, need for a filter change, and time. The controller may have a graphic specific to the design and function of at least one of the blower assembly, lighting, and the ventilator.

One or more sensors for the cook top may also be used to sense various environmental conditions. In one embodiment, a sensor scans the cook top for an item placed thereon. It may then provide feedback to the appliance to operate a fan in the blower assembly. Sensors for the appliance may be also used to detect at least one of filter buildup, back pressure, air flow, gas, smoke, heat, temperature, filter change requirements, speed, power, resistance, voltage, programmed operations, and set points.

The appliance may also be equipped with at least one of an output display, a rotating display, an LED display, a LCD display, a sliding panel, a retractable display, a removable display, a fixed display, an illuminated display that can be adjusted in color and intensity, a plasma display, a dot matrix display, a vacuum fluorescent display, and a popup display. The display is preferably mounted on the cooking surface or backing for easy viewing. The display device preferably displays to the operator at least one of operations, temperature, functions, range position, and times.

The appliance preferably further comprises movable lighting on either the backing, cook top, or the ventilator for illuminating a work surface. The lighting can be any device to illuminate the cook top including a device that is at least one of an adjustable light level device, adjustable light position, hidden lights, exposed lights, a series of lights, a mini fluorescent tube, mini neon tube, an LED, rope lights under a decorative flange trim of the ventilator, recessed lighting, direct lighting, and indirect lighting.

In one embodiment, the ventilator is adjacent at least two cavities and has at least two blowers. The second blower preferably has a speed control independent from a first for moving a different volume of air away from a second induction-heating element.

A filter is preferably attached below the vent with the cavity at an angle and coated with an agent for cleansing air that passes therethrough.

The appliance preferably also has a heat exchanger in communication with the vent for at least one of extracting effluents, cooling drawn air to a proper temperature, and recycling air back. This heat exchanger includes at least one of a heat pump, an electronic cooling device, a refrigeration unit, and a magnetic cooling device. The heat exchanger may be used in such a way to turn the downdraft into a cooling/heating ventilator.

One embodiment of the appliance has a fire suppression system operably connected to the cook top for controlling fires and added safety. An IR system may be employed in such a system. The IR system may be operably connected to the cook top for detecting at least one of temperature, resistance, heat, fire, distance, moisture, and steam. The IR system may employ a variety of sensors. Such sensors may have at least one of an electronic, an electromechanical, and mechanical component. This system may also have an electronic touch controller in communication with the circuit board.

The appliance may also include other specialized devices, such as, a device for detecting and controlling of speed for the blower, an air flow sensor for detecting the flow of air past a filter, a sensor that measures the air flow and provides a signal to user for filter replacement due to restricted air flow, a beam or other detector sensor to scan the surface of a work area for an item placed on the work area and to provide feedback or control with automatic operation of the ventilator, a means for detecting gas flow, an ultrasonic sensor, a thermo detection device for the control of the downdraft, a digital CO2 sensor, an NDIR technology sensor, and a sensor having the ability to detect back pressure that triggers an increase in fan speed to maintain the proper volume of extraction.

The system preferably incorporates an air flow diverter system or barrier system which prevents exhausted, heated air from having a direct path to the intake opening in the housing of the cook top. This prevents the heated air from re-circulating through the system and thus increasing the temperature in the system.

2. Detailed Description of Preferred Embodiments

Various embodiments of the present invention are shown in FIGS. 1-26 which are described in additional detail below.

FIG. 1 shows one preferred embodiment of the appliance 15 of the present invention. In this embodiment, the appliance 15 includes a cook top 20 with induction coils, for example, induction heating elements 25 on the cooking surface 28. In one preferred embodiment, a backing 29 is provided, for example, splash protection. The appliance 15 and cooking surface 28 are preferably comprised of a metal, glass, stone, plastic, or other materials.

A cook top vent or ventilator 30 is provided to appliance 15 for removing effluent and hot air from the cooking surface 28. The ventilator may consist of a vent cover 31, which covers a vent hole 32. Below the vent cover 31 is a lower cavity (not shown) which preferably attaches to a plenum (not shown). The outer skin of the ventilator is made from preferably metal, although glass, stone, plastic, or other materials may be used. Because of the flexibility of the design and the low profile of the blower assembly, the outer shape of the ventilator can be styled to meet nearly any requirements.

Also shown in FIG. 1 are various controls 58 which may include slides 50 and knobs 52 to control, e.g., heat to heating elements 25a-25d and, also in another embodiment, the up or down movement of the ventilator 30. On the backing 29, a scanner 82 may be mounted. Also mounted on the backing may be lighting 45 which preferably includes a control for the lighting 96. In one preferred embodiment, a sensor 90 is also provided. A drawer 26 may be present below the cook top 20. The drawer 26 may allow access to storage or a warmer drawer 27.

Figure 2:
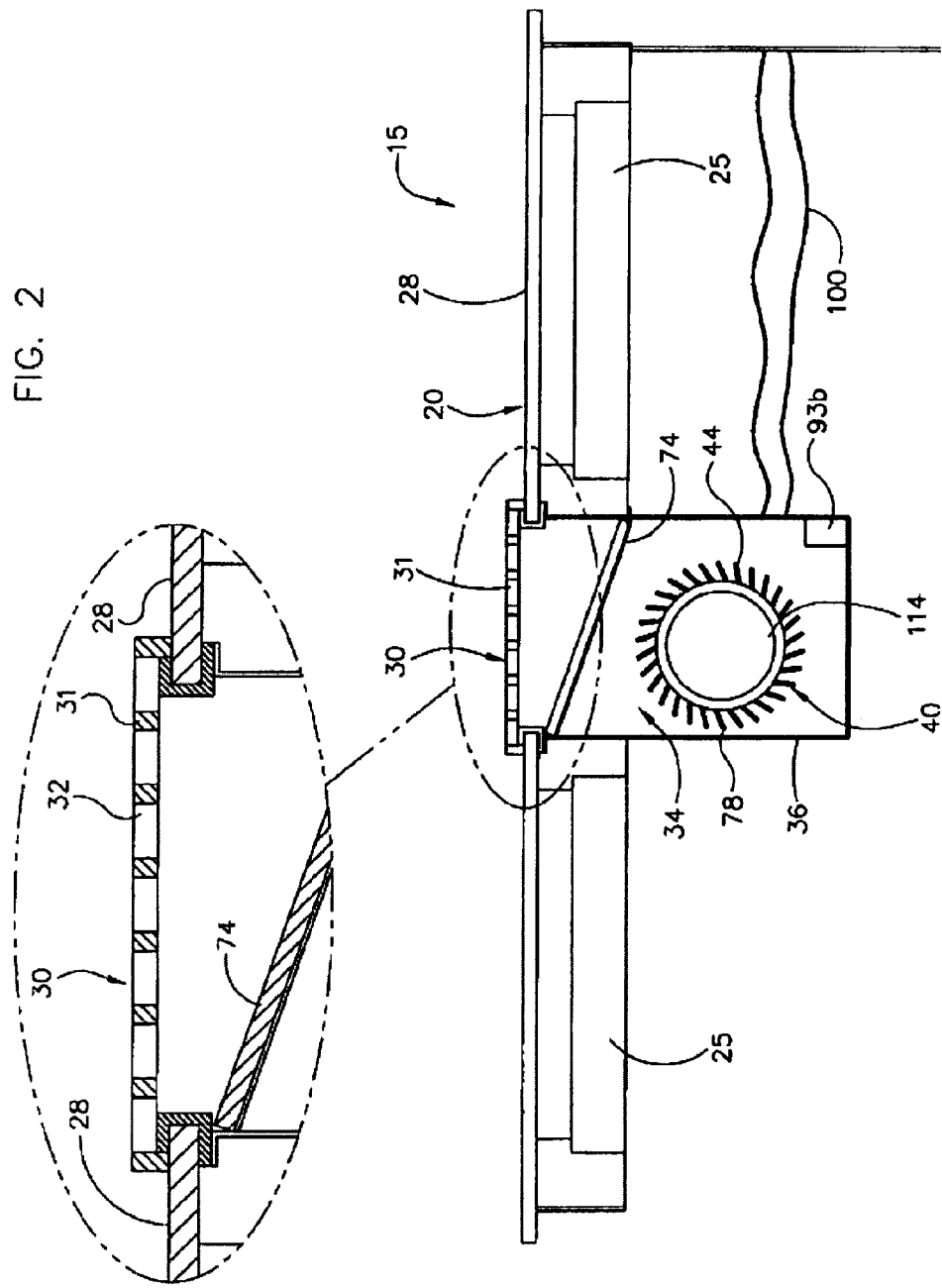
FIG. 2 illustrates a cutaway front view of the appliance of FIG. 1 along the line 2-2.

FIG. 2 shows a cutaway of the embodiment of FIG. 1 along the lines 2-2. In FIG. 2, the lower cavity 34 and the plenum 36 are shown. Inside the cavity 34, is preferably a blower assembly 40 which may include a fan 44. The blower may alternatively be located in a plenum chamber. The fan may have fan blades 78 protruding from a center portion. Above the fan and below the vent, is preferably mounted a filter 74. The filter may be mounted at an angle to allow for ease of runoff of any grease or other unwanted materials. In one preferred embodiment, the fan is a cross flow blower 114. In the preferred embodiment shown in FIG. 2, duct work 100 connects the lower cavity 34 with an outside vent. The storage or other space 27 is below the blower assembly 40. A sensor or detector 93b is also preferably present for detecting fan air flow draw efficiency.

Figure 3:
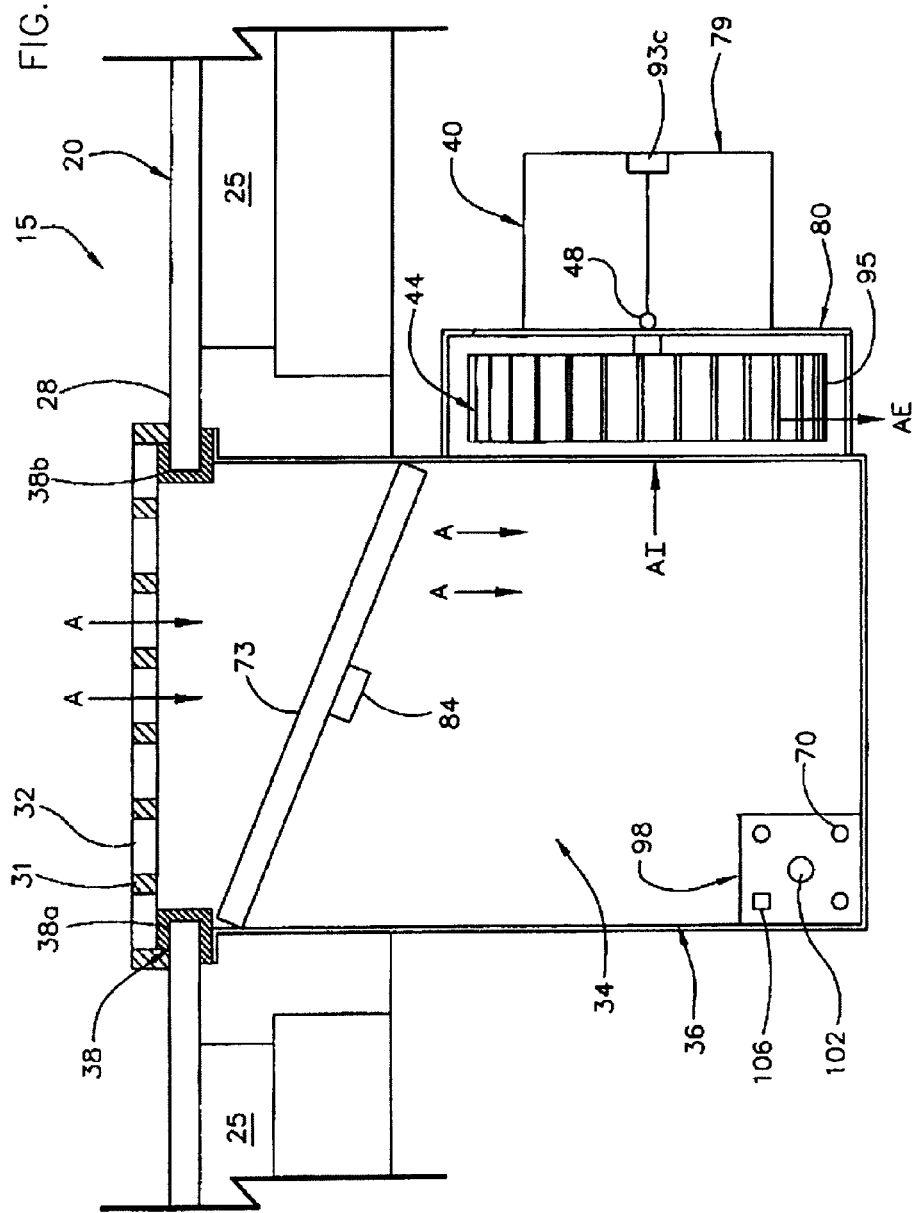
FIG. 3 illustrates a cutaway front view of another embodiment of the present invention.

FIG. 3 shows another embodiment to the current invention. In this embodiment, the vent cover 31 includes a grate which has a series of vent holes 32. A system for managing air flow 38 is also provided. In this embodiment, the system for managing air flow 38 includes seals 38a and 38b. Of course, many other components are possible. For example, a filter assembly 73 may be also present. A means for detecting filter buildup 84 is preferably attached to the filter assembly 73. Within the plenum or the lower cavity, is a control board 98, which includes a micro-controller 70, a processor 102, and preferably a programmable control 106. On one side of the plenum is mounted a blower assembly 40. The blower assembly includes a fan 44, which in this embodiment is a centrifugal flow fan 95. A regulator 48 for controlling the electric current to the blower assembly 40 may be connected to a heat sensor 93c. When the heat sensor 93c detects an increase of heat, the sensor may signal the regulator to shut off electric current to the blower assembly. Here, the fan is preferably operated by an AC motor 79. Centrifugal fans are sometimes referred to as wheel fans 80.

In FIG. 3, air, shown by arrows A, enters through the grate 31 and travels downwardly into the cavity in the appliance 15. The air (arrows A) then travels past the filter assembly 73 and is drawn toward the fan assembly 40. The air enters into the fan assembly (arrows AI) and then is exhausted from the appliance preferably out an exhaust vent (see, e.g., arrows AE). Of course, the air entering the vent grate may be laden with cooking gases, odors, effluents, grease, oils, etc., but the air exiting (arrows AE) is preferably cleaned air.

Figure 4:
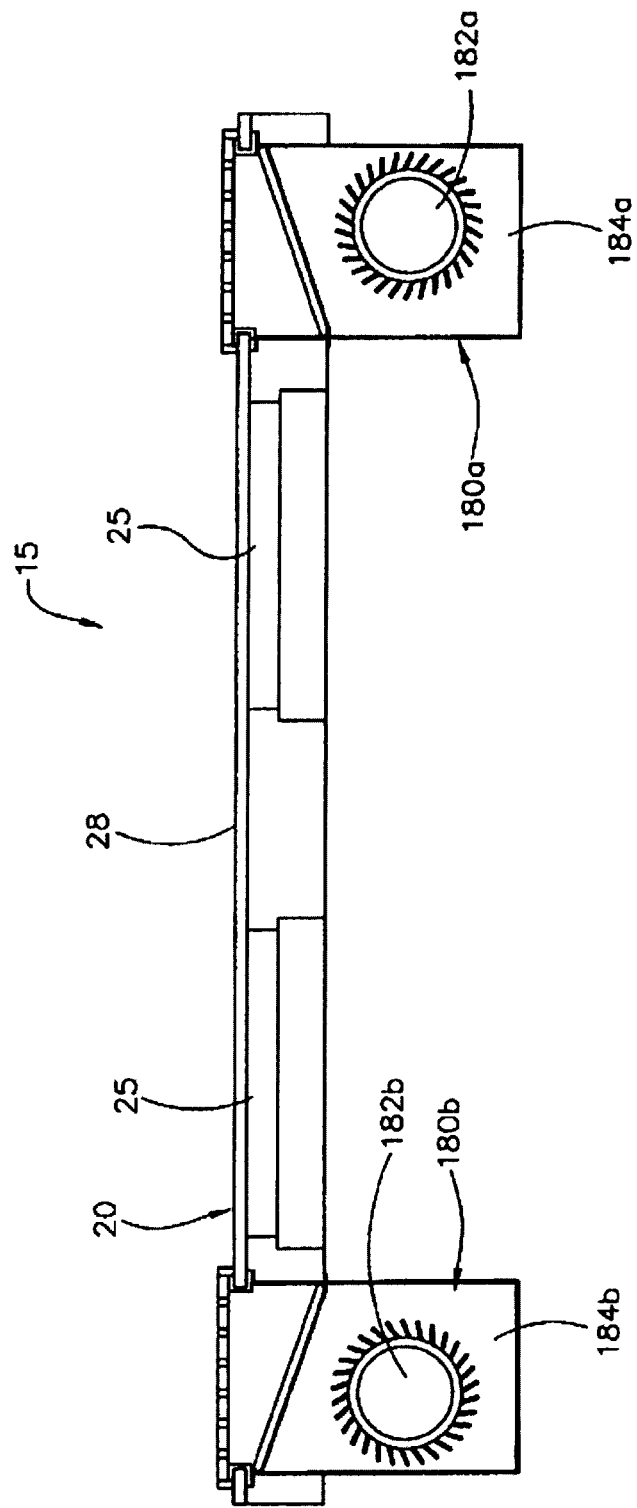
FIG. 4 illustrates a cutaway front view of yet another embodiment of the present invention.

FIG. 4 shows another embodiment of the appliance 15 having a cook top 20 with assemblies 108a and 108b to provide and enhance cooling to the induction heating elements 25 and the cooking surface 28. These assemblies are provided with a mechanism for sucking air. In this preferred embodiment, the mechanism for sucking air includes a first blower assembly 180a and a second blower assembly 180b. The blower assemblies include a first fan 182a and a second fan 182b. The fans are preferably mounted in cavities 184a and 184b.

Figure 5:
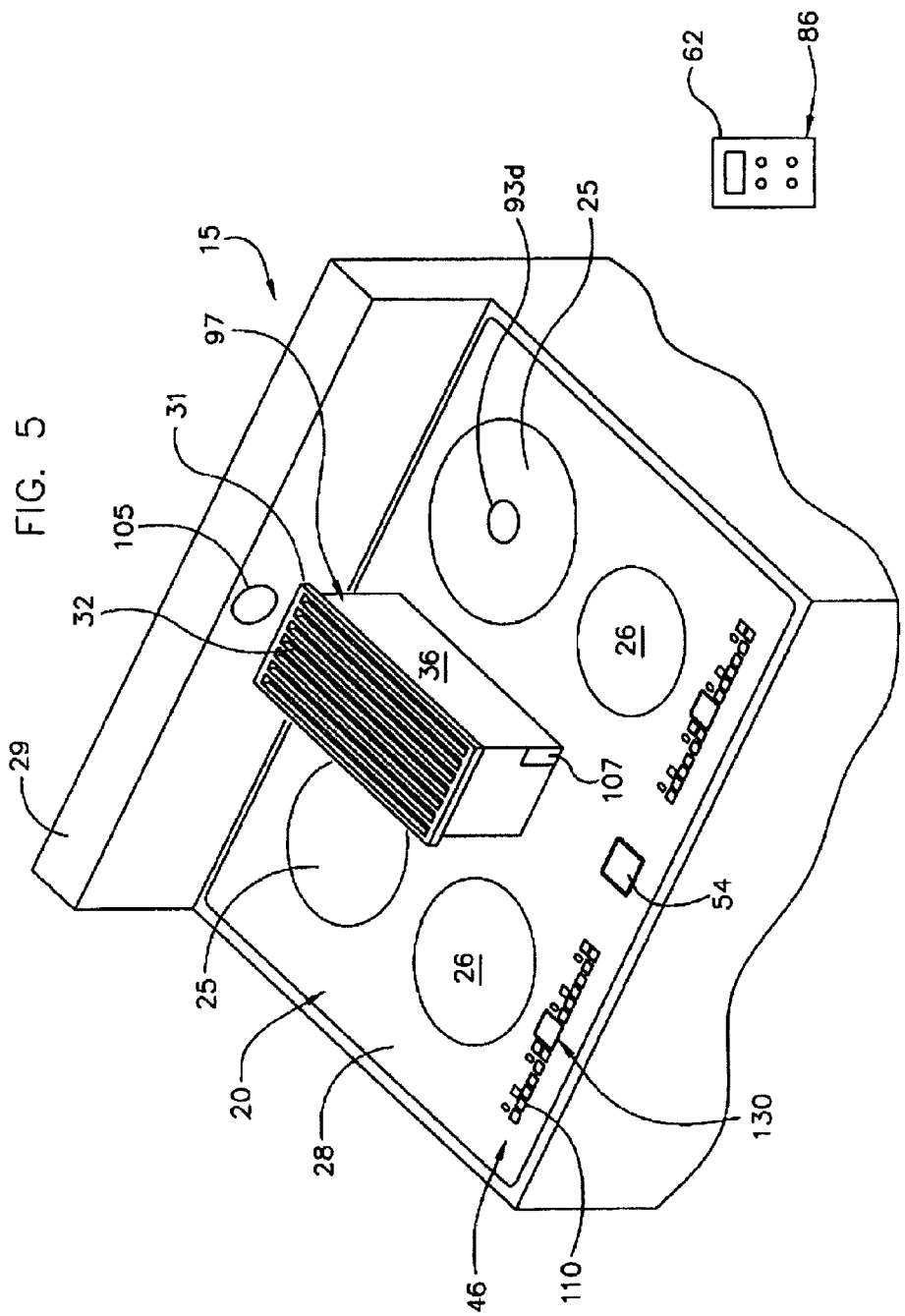
FIG. 5 illustrates a perspective view of yet another embodiment of the present invention.

Another embodiment of the present invention is shown in FIG. 5. There, the appliance 15 has a cook top 20 which has two induction cooking elements 25 and two regular electric heating elements 26. As such heating elements are well known in the art, these will not be described in further detail.

The center of the cooking surface 28 preferably has a cook top vent such as a cooking surface opening 37 and a telescoping downdraft ventilator 97. The ventilator includes a plenum 36 and a vent cover 31, which covers a vent hole 32. This telescoping ventilator 97 can move up and down through cooking surface opening 37 relative to the surface to provide maximum ventilation. Also included on the cooking surface are means for adjusting the ventilator's fan speed. Preferably, such a means includes a keypad 110 having an output display 130. Also included on the cooking surface may be a membrane switch 54 which in this embodiment preferably controls the up and down movement of the telescopic ventilator 97. Integral with the induction heating element 25, may be a heat sensor 93d to detect and control heat to the unit. In this embodiment, a remote control unit 62 may be included for remotely controlling the appliance 15. The remote control unit 62 may be integrated into computer system 86 to add further appliance integration and control. Such a unit may be integrated into a whole house system (not shown) which controls various appliances and household operations.

Figure 6:
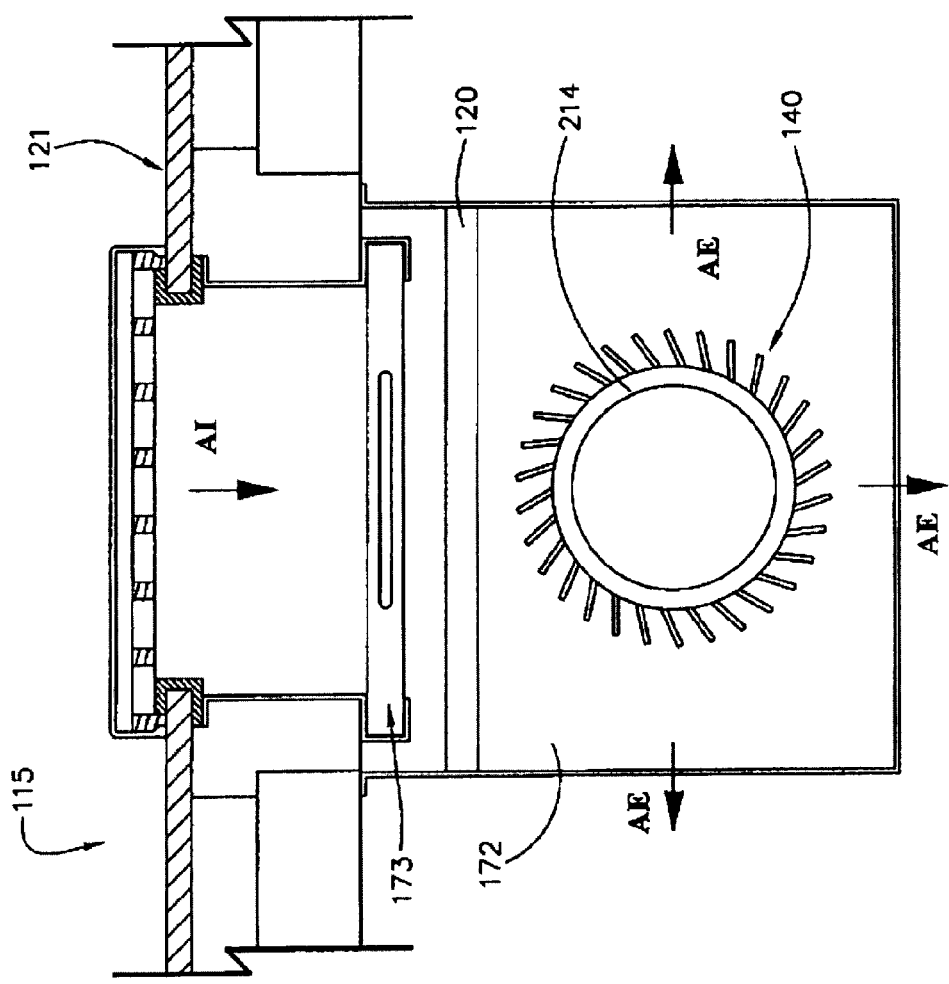
FIG. 6 illustrates a cutaway front view of still another embodiment of the present invention.

FIG. 6 shows yet another embodiment of the current invention. This embodiment includes a filter assembly 173 which is contained in the inner cavity 172 of the appliance 115 below the cook top 121. Below the filter assembly 173 and filter is preferably a heat exchanger 120 which provides for cooling of the effluent and heated air as it passes through the air filter and down into the inner cavity toward the blower assembly 140. In this embodiment, the blower assembly preferably includes a cross flow blower 214 with a wheel fan.

Figure 7A:
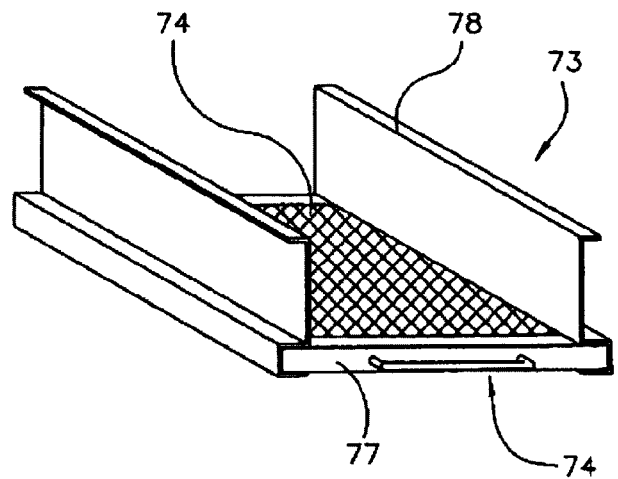
FIGS. 7A-B illustrate enlarged perspective views of various embodiments of a filter of the present invention.
Figure 7B:
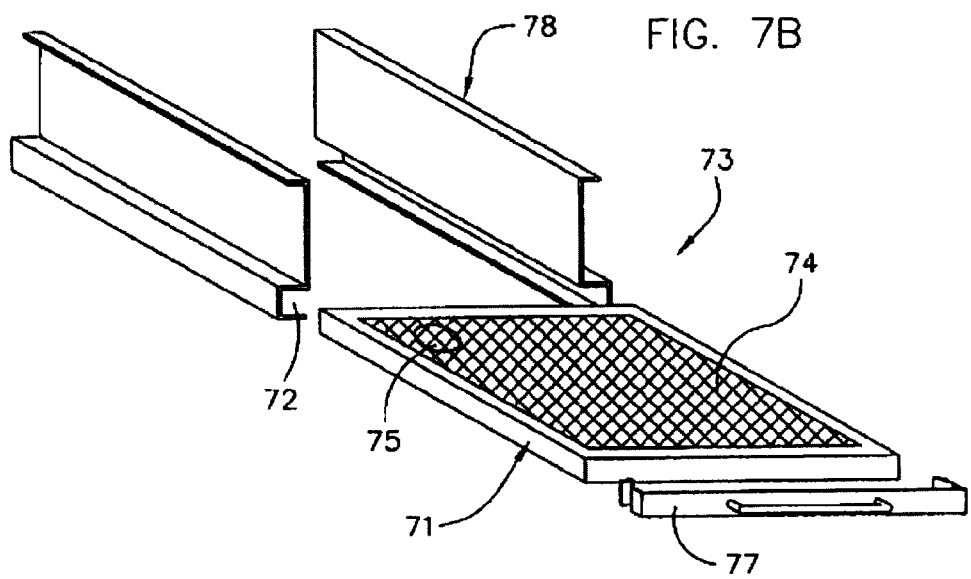

FIGS. 7A and 7B show a filter assembly 73. The filter assembly includes a filter tray 71 which fits into a tray slot 72. The filter tray includes a filter 74 and an air flow sensor 75. The filter tray 71 has a filter tray handle 77 which may be removed when the filter 74 is ready to be discarded. The filter assembly 173 preferably forms a filter tray drawer which can slide in and out of the inner cavity 172 of the appliance 115 as best illustrated by FIG. 6.

Figure 8:
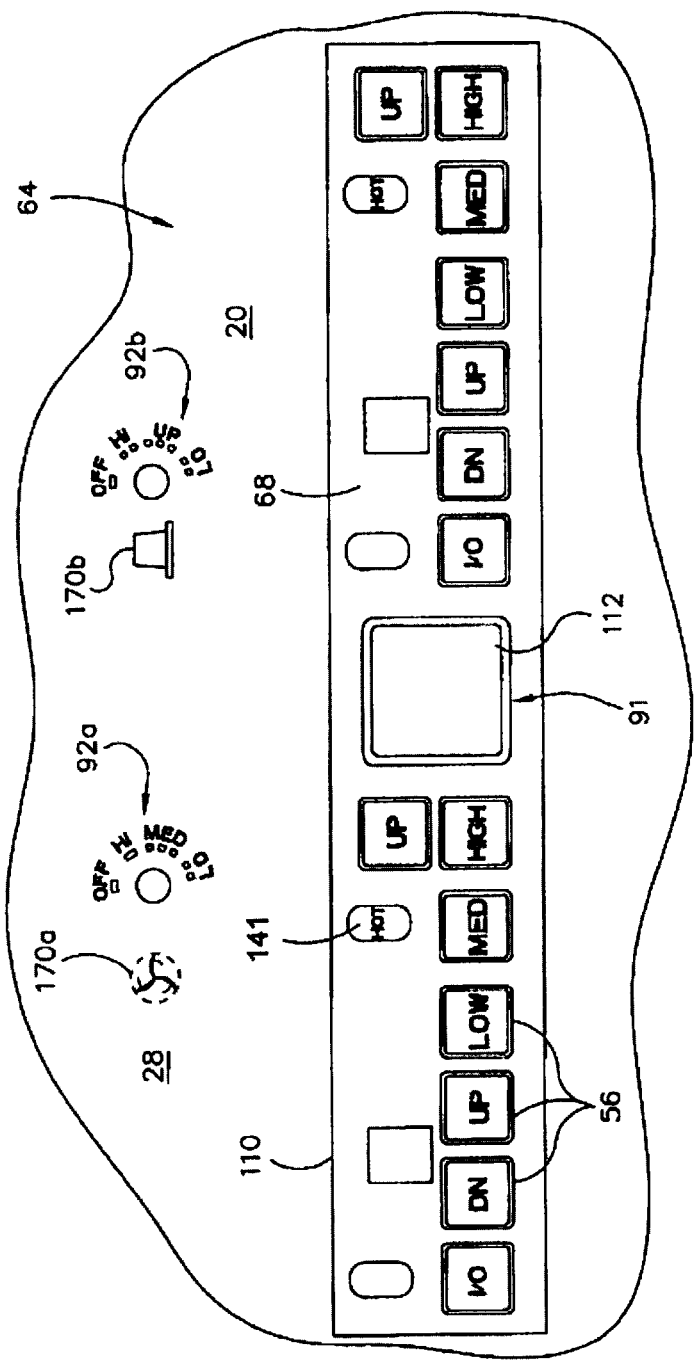
FIG. 8 illustrates a top view of controls of yet another embodiment of the present invention.
Figure 9:
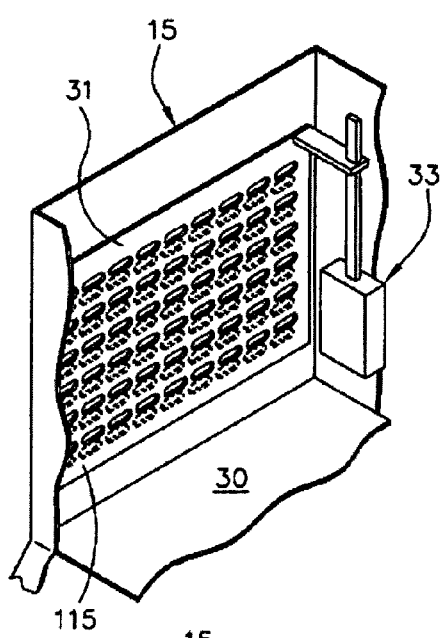
FIGS. 9-12 illustrate enlarged broken away views of vents of various embodiments of the present invention.
Figure 10:
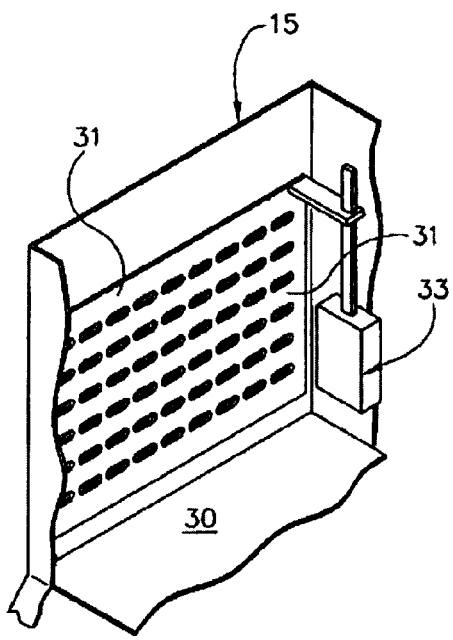

FIG. 8 shows another embodiment of the present invention. In this embodiment, a broken-away section of the cook top 20 is shown. In this embodiment, on the cooking surface 28, is preferably mounted a series of controls. These controls include touch devices 46 which are part of preferably a keypad 110. The keypad 110 may be integrated into an electronic control system such as the control panel assembly 64 which may include a touchpad controller such as touch control panel 68. A display device 91 may also be present. The display device 91 acts as a display interface 112 to interface with the user. Also on the cooking surface may be other controls such as selection switches 92a to control the fan speed, and 92b to control the height of the telescoping ventilator. Graphics such as a fan 170a and a telescoping ventilator 170b are used to indicate the type of controls. As can be seen at FIG. 8, the controls can act as on/off switches, high/low switches, up/down switches, and high/medium/low switches. On the panel may also be an indicator light to indicate that the surface is hot. Such an indicator light may be an LED display 141.

As mentioned, a filter or catch 74 is preferably used for removal of effluents. The filter 74 may use carbon for removing odors, particulates, greases and oils, and moisture that condensates on the median. Additional filters may also be included. A metal mesh filter also may be used as well as a louver-type filter. A combination of these filters with a charcoal element may also be used in this application. In a preferred embodiment, the filters are angled to drain fluids off and collect them into a grease trap. A grease trap or trough is also preferably provided. These troughs are removable for ease of cleaning.

The sheet metal/material construction of the appliance's back housing 29 may also accommodate a lighting system as mentioned above. This design allows any type lamp holder to be installed in a convenient way. For example, in one embodiment, by twisting a male connector to the female connection, a fixture is locked in place. The female connection can be designed into the housing providing a fixed point.

Alternatively, lighting may come from a ventilator and provide lighting at different angles. Lighting provided may also be on a bendable, moveable arm, e.g., a snake light system.

In one preferred embodiment, housed within the ventilator's outer frame of metal/plastic or other material is an opening to provide the viewing of an electronic display. The electronic display may also include the control board electronics. The controller is preferably an electronic board attached by bolts and nuts, but could be held in place by other methods like adhesive, tape, connector, etc. The wiring for the control panel preferably is shielded from being seen and being contaminated by dirt that may coat the wires.

As mentioned, the appliance 15 of the present invention preferably has at least, e.g., one sensor 90. The sensor may form part of a sensor system that includes one or more of the following: a pot detector system, an IR detector system for heat, smoke, fire and/or distance, humidity, a gas (e.g., hydrocarbons, CO, CO2) detector, a pressure sensor, moisture or steam sensor, temperature or thermal sensing technology such as RTDs (resistance temperature detectors), integrated circuit sensors (IC), thermistors, IR thermometers, bimetallic, and thermocouples. Other sensors may include any electronic AC or DC sensor used for detecting movement, UV reflectance, resistance, flow, item detection, noise, power, or other sensor for the detection and control of the ventilator blower with electronics. Also, a sensor may be used for detection and control of speed for both the fan/blower and the drive mechanism. Sensors for the detection of the temperature are preferably located on the cooking surface 28, back housing 29, or ventilator 30. Other sensors are directed for the sensing of the items placed on the cook top or the range. The sensors are preferably connected to control board 98 via wires or a wireless connection. Finally, an air flow sensor may be provided to detect the flow of air past the filter(s). See, e.g., FIG.

7B, sensor 75. This feature preferably measures the air flow and indicates to user the need for filter replacement or cleaning due to restricted air flow.

Of course, any IR/thermometer that can measure objects that move, rotate, or vibrate (e.g., web process or any moving process) may be used in addition to the ones mentioned above. Such IR sensors are useful as they do not damage or contaminate the surface of the object of interest and they measure the temperature of the actual product being used on a cook top or range and not some of the other parts of the surfaces. Further, the thermal conductivity of the object being measured such as glass, metal, wood, or even very thin objects does not present a problem, as with other sensors. Response time of these sensors is in the millisecond range, which gives the user more information per time period. Any other electronic IR sensor used for detecting temperature, resistance, heat/fire, distance, moisture/steam, or power for detection and control of the ventilator blower with electronics may also be used.

Two types of ventilators may be used with the present invention, ducted and non-ducted. In a ducted-type ventilator, there is a duct that is used for venting air to the outside. See, e.g., FIG. 2. This duct can be attached at the top, back, or directed downward to the floor in a room, or have a chimney cover the duct at the top.

In a non-ducted-type ventilator, there is no duct that is used for venting air to the outside. See, e.g., FIGS. 3 and 6. This non-duct unit can be vented at the top, side, back, front, and/or directed downward to the floor in a room.

As mentioned, a cross flow fan/blower assembly preferably provides the drawing force needed to pull contaminated air into the ventilator. The assembly is preferably composed of a housing mounted to the appliance. Attached to the housing is the drive motor. A wheel assembly contains the bearings, hub, and a wheel of either the skewed or straight bladed type. A fastener preferably connects the wheel assembly to the motor.

Multiple burner specific blowers and ventilators may be used to divide the cooking surface 28 into zones that provide air flow control within the zone. An air curtain may be created at the perimeter to preferably enclose these zones. Blower motor speed in the zone may be reduced with the improved efficiency and thus the noise level may be decreased. This greatly increases the overall efficiency of venting. Moreover, the energy saved from not having to turn on and run another large blower motor provides added benefits to the user in the way of cost saving. An added benefit is a lower ventilator profile due to the more efficient, smaller motor(s)/blower(s) assembly. This gives a person more room for viewing and working under a ventilator, or a larger cabinet below the ventilator to provide more user space. The fan/blower may also be used for ducting heated air or moisture out.

Another aspect of this design is the ability for the fan to be controlled by a humidity sensor, CO, or CO2 sensor, and/or hydrocarbon detectors. See, e.g., FIG. 1, sensor 90. Greater versatility may be had with the use of electronics and the different types of exhaust elements. These innovations control the power load for the exhaust vent and only supply that amount of power needed to effectively operate the ventilator. Electronics or electromechanical controls may also prevent the spread of fire through regulating electricity flow, blower speed, and heat.

As mentioned, the ventilator preferably includes a tangential or cross flow fan/blower that uses an AC or DC drive motor(s). The cross flow blower(s) may use tangential wheels and skewed fan blades, straight blades or other blade designs for the moving of air. Alternatively, a long length axial or centrifugal fan/blower assembly wheel may be used. The fan may be of a fixed or a variable speed with nearly infinite speed setting. As mentioned, the blower is preferably located as close to each of the burners as possible. With two or more blowers, different size blowers may be used with different cubic feet per minute ratings (CFM). This provides greater effluent removal where needed. If large burner elements are located at the front of a range, the invention provides the ability to use a large cross blower (CFM) near those burners to remove the contaminated air. Each fan can be used as a power exhaust vent for removing air, or mixing fresh air with return air, and/or management of moisture/heat buildup. Fan operations may be controlled by a sensor, detector, or switch. Such individualized features allow the ventilator to detect the air flow draw needs for each burner and also the amount of draw needed. As the blower draws air downward, it eliminates hot spots or stratified layers of varying temperatures on a range's cook top. Alternatively, the fan/blower(s) may be remotely located from the ventilator or built on/in with duct work while still providing individual air removal near a burner. These ducts can be closed off to each location and opened when selected by a user or system.

As shown in FIG. 8, unit 15 may have a panel 64 with, for example, a display 91 that shows the user, e.g., fan speed levels. This can be used to assist in finding proper speeds and heights, which then can be programmed into an electronic control board for repeated operations later. Further, the panel 64 has the ability to show to the operator, e.g., types of operations, functions, filter life/change, and times using electronics and to accurately control these operations to remove contaminated air. Such a panel 64 may also be used to control movement and operation of the ventilator 30. Construction of the electronics includes high heat construction design, specialized adhesive construction, loop resistant circuitry, ESD/EMI/RFI shielding, and LED, LCD, plasma, dot matrix, vacuum fluorescent display(s). All of these can improve the control, display, design, look, and operation of the electronic(s). Electronic touch control panel(s) could use a piezo touch panel (keypad) for selection of operations by operator. In some instances, the controls are sufficiently isolated in other ways to prevent appliance temperatures from damaging the control.

As mentioned, the panel 64 may include an electronic touch controller 68, e.g., a keypad that may be made of glass, metal, or plastic, with selection of the operating function(s) made by touching the surface of the glass, metal, or plastic. For the ventilator, a resistance-type touch control keypad may be used whereby touching plastic, metal, or glass at a location, e.g., on top of the ventilator, causes a change in an electrical signal. The piezo, capacitance, resistance, and inductive and tactile membrane switches used may be fitted with decorative overlays, underlays, labels, trim, and completed control panel assemblies. Touch control key pads/panels may be installed flush, raised, or recessed. It should be noted that the touch control key pads/panels may be installed in nearly any plane and on any surface. For example, touch controls keypads and displays may be placed on the front or top of the cooking surface 28 to provide the operator with instant viewing of the operations and functions. A remote control 62 may be added by wire or by wireless controls. See, e.g., FIG. 5.

As mentioned, the electronics provided allow for programmable/selectable set points, programmable/selectable set times, and programmable/selectable set operations as well as set times for both on and off or changes in functions, set points, speed, or functions. The ability to select multiple functions, operations, and times gives the inventive appliance advantages over non-electronic controlled units. This programmability/selectability provides the advantage of being able to enter different functions or operations into the electronic controls and have the system respond. Further, an electronic control permits more user freedom.

Another aspect of the present invention is a multi-function display. For example, a clock may be on the electronic(s) display when not in use or when in use. See, e.g., item 112 in FIG. 8. It may also be changed to permit other programmable information to be displayed, such as, messages or computer information. This area may also have an LED night light included in the electronics such that the LED would come on when the room is dark. The use of an LED or a bulb of this type can save energy and space.

Another aspect of this invention is the ability to have "no switch" controls. Here, for example, the cook top backing 29 acts as the switch. For example, a user may touch the trim top surface in the front, top, or sides and this would operate the ventilator by moving it and turning on the blower. Alternatively, a user may touch the ventilator a number of times to move it up or down or to speed up or slow down the fan. The user may also touch the ventilator and hold for a longer time to which the blower would turn off or on. The user may turn a light on in the same manner.

Voice Control/Sound Control, Whole House Control System or Individual Computer Control System The appliance 15 may also be equipped with a sound- or voice-activated system that, in one embodiment, lets the user speak to the appliance and state what controls and operations the user wants. This provides the user the ability to operate hands free, therefore, allowing the users to do something else with their hands. Alternatively, the appliance can be hooked up to a PC computer or a whole house computer system for operation and control.

Another aspect of this invention is an appliance 15 designed with a temperature control or cooling element 120. See, e.g., FIG. 6. The element 120 is preferably secured to the inside of cavity 34 or remotely. In this one embodiment, heated air is circulated through the ventilator 30 and past the element 120 to provide better heat control to the non-ducted ventilator both inside the appliance and inside the cooking room. The fan or blower assembly 40 provides air movement inside the cavity. This system cools/heats the exhaust air before delivery of air to the room. Preferably, such a system is included with a non-ducted unit. These cooling systems are sometimes referred to as a "heat pump". Thus, such a heat pump may be used to make the ventilator not only a venting unit, but a cooling/heating unit. This feature is important, for example, when larger ventilators are designed to recycle air back into the room. With the use of larger cook ranges, a large amount of heat is generated and returning this heated air to the room can be a big issue for the user. Here, the cooling/heating system is used for extracting effluents (like steam) and cooling of the drawn air to a proper temperature for return. The system may also include a device to select a precise return air temperature. For example, with the ability to cool and treat the exhaust air, this feature provides the user the ability to select the temperature of the returning treated air to the room, e.g., 70 degrees Fahrenheit. Humidity buildup in the cavity chamber may also be controlled by a power venting or condensation drainage system. The system may include an electric chill or a refrigerant such as that found in freezers, a circulating system to provide removal of heat, or an electric cooling heat exchanger.

Figure 11:
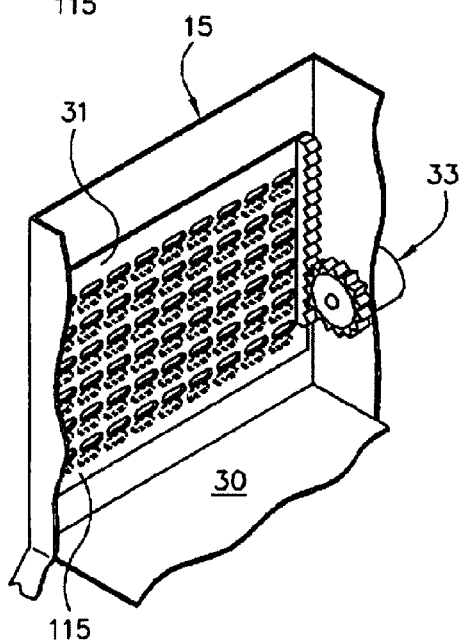
Figure 12:
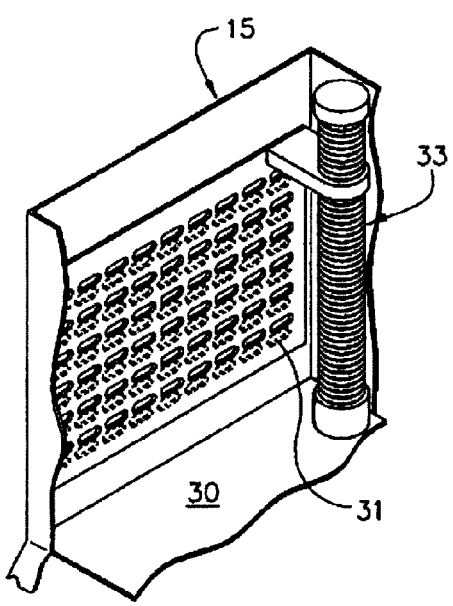
Figure 13:
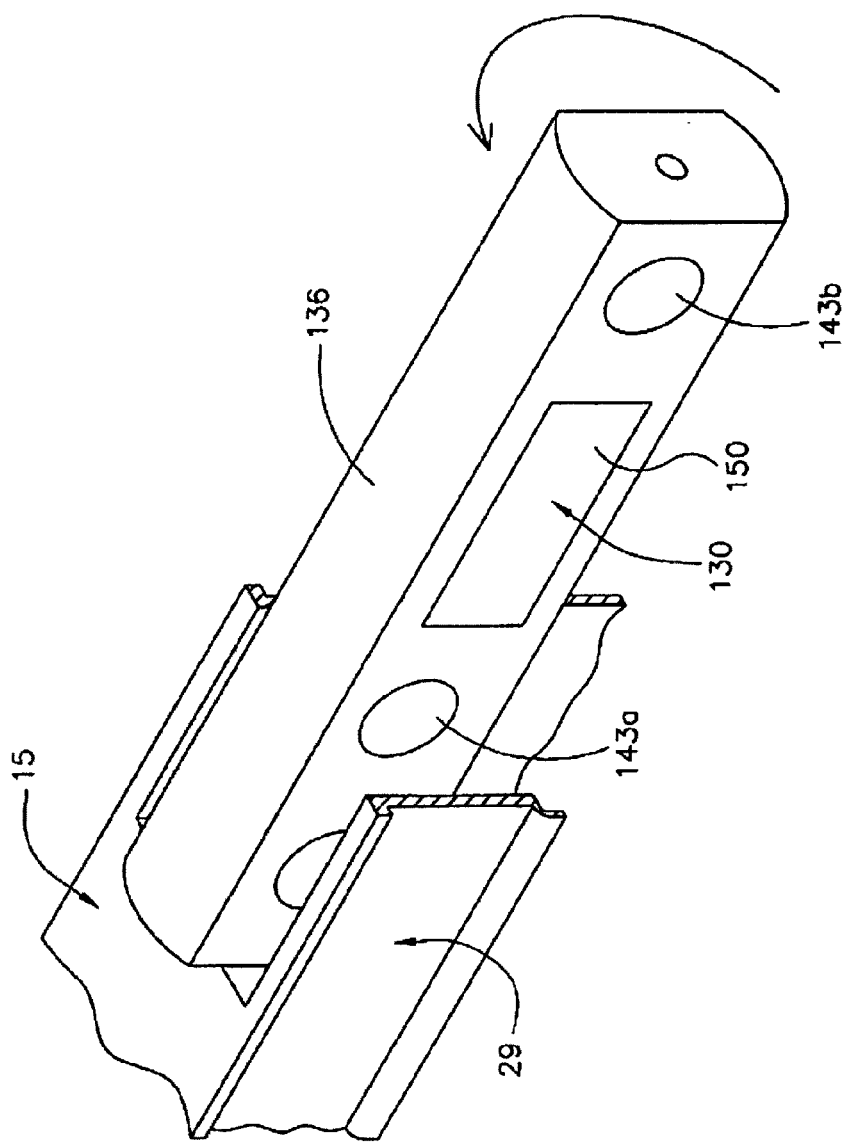
FIG. 13 illustrates an enlarged broken away view of a display of one embodiment of the present invention.

As mentioned, the vent 30 may have a vent cover 31 that includes louvers, holes, or slotted opening(s) for exhausting treated air. These may be closed off by a motor-driven vent slide, bimetal device, solenoid, electromagnetic or other electronically or electro-mechanically controlled shut-off device 33. FIGS. 9-12 show a few of the embodiments of this feature. For example, FIG. 11 shows an embodiment with gear teeth on it. Preferably, it is in contact with a stepper motor/AC motor/DC motor that controls the opening. Other devices that deliver motion, such as linear motion devices, wax motors, etc., may be used. The cover regulates the flow of air being exhausted or brought in. The vent cover may be fully opened or closed (sealed cavity), or opened to a varying degree to control heat or moisture buildup. When used with a forced air (powered) re-circulating system, even greater control can be had. The damper or slide system allows for flows to be proportional thus controlling air movement and contaminated air for cleaning. Even though FIG. 1 shows the slots on the top of the ventilator, vents can be at the side, front, and at the back, or in or at any location on the ventilator. The vents may also be closed in the event of a fire on the range.

Figure 30:
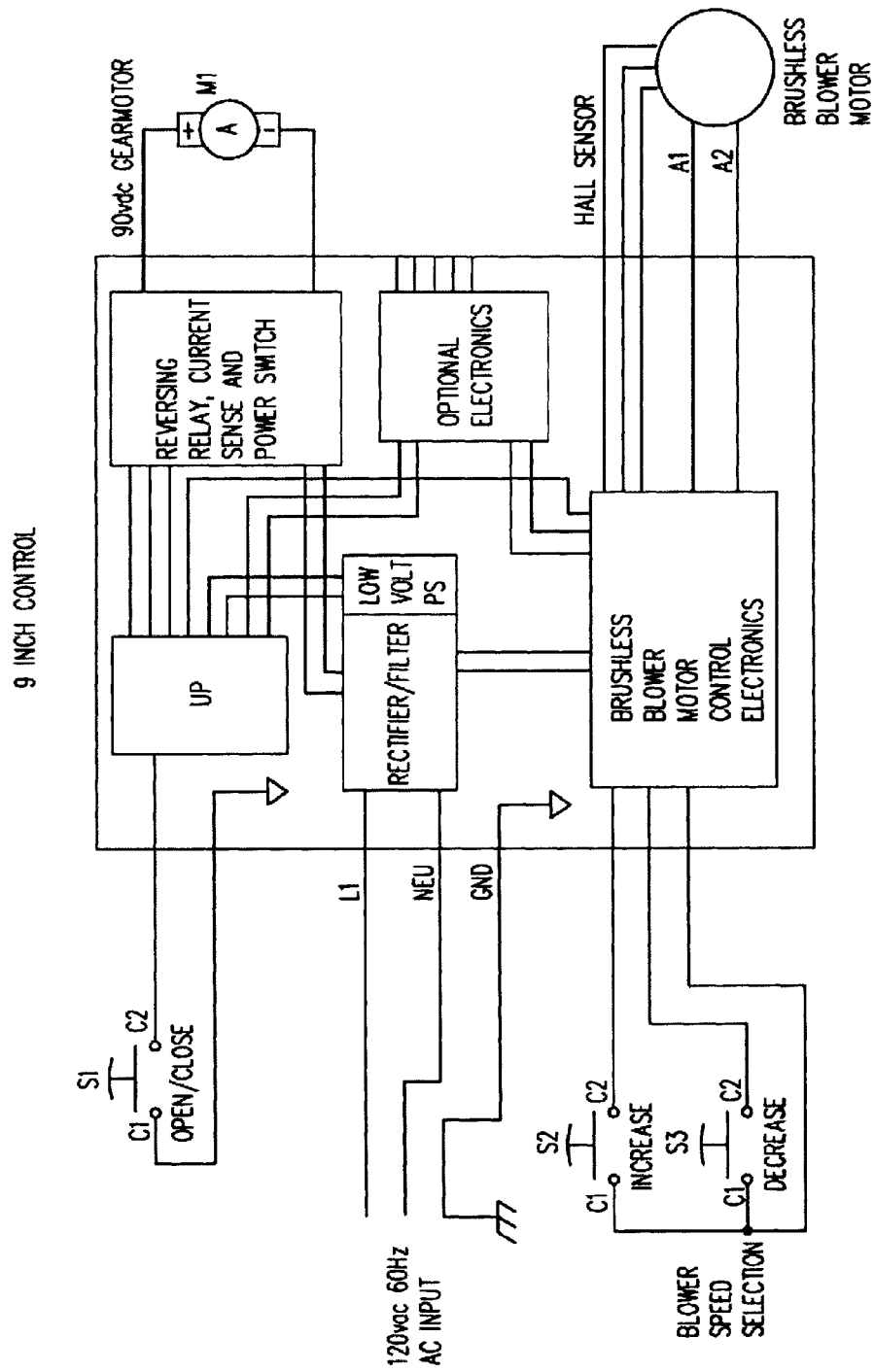
FIG. 30 shows examples of wiring schematics for electronics of the present invention.

In accordance with another aspect of this invention, the ventilator may be controlled by electronics and equipped with an AC or DC electronic temperature sensor, e.g., sensor 93a, 93b, 93c, and 93d located on the ventilator, cook top, or elsewhere such that the temperature of the ventilator can be detected accurately. See FIGS. 1,-3, and 5. Such controls provide control and operation response to sense temperature on the range or in the ventilator and then turn the exhausting functions on/off and adjust speed according to needs. Any electronic sensor used for detecting heat/temperature, CO, $CO_2$, hydrocarbons, or power, for example, thermal detection devices, may be used to control the exhaust. In one embodiment, the blower exhaust motors are electronically connected to a temperature-sensing device and is DC powered in accordance with requirements for the unit. Here the motor/blower is also protected in the event of a fire by an automatic turn off. The user may also select settings or preset settings for the electronic control(s) to maintain the desired exhaust flow within the vent's chamber. The sensing device maintains performance in a predetermined desired range of operating temperature(s) or set point(s). A sensor may also be mounted on an electronic board or it can be attached by itself to any wall or location from which detection of the board's temperature can be made. FIG. 30 shows examples of wiring schematics for electronics of the present invention.

RTDs may be used to provide the appliance low cost over other methods when used with electronics. Even though RTD sensors tend to be relatively slower in response than thermocouples, which are used in many ventilators today, RTDs offer several advantages well known to those of ordinary skill in the art.

For example, one method for a sensor circuit uses an RTD temperature-sensitive element to measure temperature from ambient to elevated temperatures. One of ordinary skill in the art is familiar with such sensor circuits, so the circuit is not shown. The information from the sensor circuit can be also displayed and/or processed for control of the motor, blower, and speeds. All of the above information can be stored on a chip. This chip can be placed in an ideal area for detection of temperature. This circuitry preferably provides data/information to the control board for controlling functions of the ventilator. Alternatively, distributed temperature may be used to sense temperature at every point along an SS sheathed fiber and feature a resolution of 0.5 degree C. and a spatial resolution of 1.5 m. The fiber can range up to 2,000 m and can be coiled at specific points of interest. The fiber can be sheathed with a nonconductive polymer for intrinsic applications. This method provides the ability to profile a range/cook top for detection of temperatures at many points. The strip may be along the complete front of a ventilator trim at the edge. Response times are thus reduced and provide the control board the ability to sense the complete top of a target zone rather than just one zone. This also provides manufacturers the ability to customize the zones placing more points in areas for detection. The use of electronics and sealed components allows theses systems to be used outdoors also.

Next generation fiber optic distributed temperature sensors (DTS) may be used as part of the present invention to sense temperature at every point along an SS sheathed fiber. These feature a resolution of 0.5 degree C. and a spatial resolution of 1.5 m. The fiber may range up to 2,000 m and can be coiled at specific points of interest. The fiber may be sheathed with a nonconductive polymer for intrinsic applications. With this system, many locations for detection are provided. Response times are shorter and sensing of the complete top of a target zone rather than the one zone may occur. This also provides manufacturers the ability to customize the zones by placing more points in areas for better detection.

As mentioned, another aspect of the present invention is to have nearly infinite fan speed adjustment levels. This can be done, for example, by having the user touch down on a glass resistance keypad until the speed required is reached. Once the speed is reached, the electronic control may reduce or completely cut off current/power to the blower(s)/fan(s). The keypad may have one or more keypad location(s) for operating the increase or decrease/on or off of the speed by the user. For example, three locations for independent operations can provide the user with better control. A display may show the user the speed level and may be used to assist in finding proper speeds, which then can be programmed into the electronic control circuit for repeated operations later. Alternatively, the sensor 93c for controlling the fan 44 may be connected to fan regulator 48, as shown in FIG. 3.

As discussed, the appliance of this invention is designed for outdoor locations as well as indoor ones. The appliance design has the ability to weather outdoor temperatures and environment. For example, the use of electronics for appliance provides better sealing for these environments. Further, remote electronic controls 62 not only provide convenient remote operations for use outdoors, but also reduce the effects for some of the environment on the controls. Further, electronics are not subject to the mechanical problems of turning in extreme weather conditions. They are also resistant to other environmental conditions.

Figure 27:
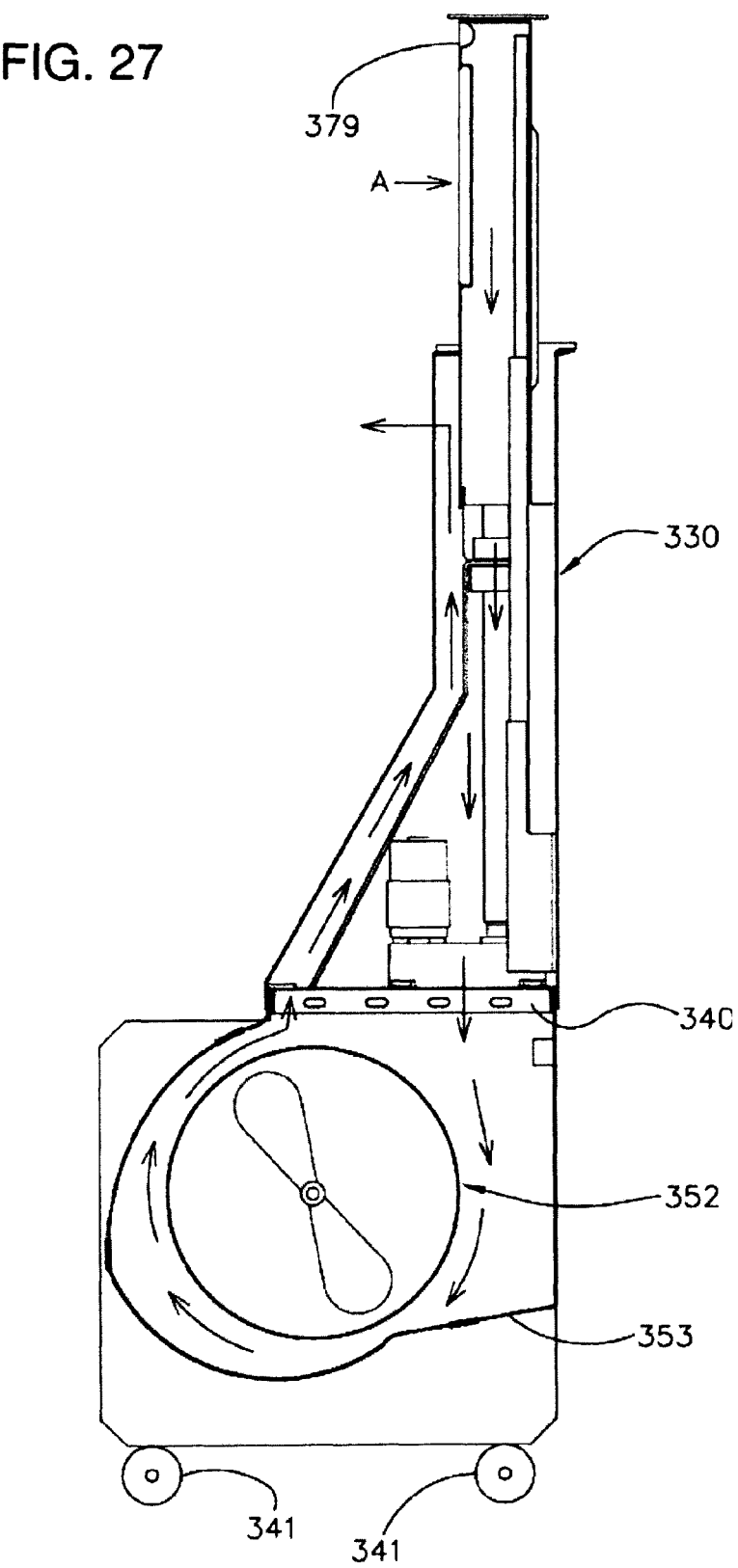
FIG. 27 shows a combined heat exchanger and filter mounted over a blower and duct according to one aspect of the invention.

As previously mentioned above, the ventilator of the present invention is very versatile. For example, it may be built into/on a mobile island or cart such as for use with grilling/cooking equipment. Alternatively, the ventilator itself may be a separate mobile unit, e.g., a frame that is self-supporting or free-standing. See, e.g., FIG. 27. Such a mobile ventilator may be, e.g., mounted on wheels and does not need to be installed into a cabinet or other unit to add structural support. This embodiment 330 preferably has a combined heat exchanger and filter 340 that is mounted over the blower 352 and duct 353. A light 379 may also be included.

FIG. 5 shows a remote sensing and receiving system which includes a sensor and/or a remote receiver 107 along with remote control panel 62 at a different location. Here, the sensor preferably includes a transducer to sense a physical parameter on the cook top of range. The transducer will generate an electrical signal representative of the physical parameter and apply the data to a processor. In response, the processor drives a digital display, which produces visual indications of these parameters. The processor provides communication between the sensor(s) and the remote receiver which drives some operations by the ventilator. For example, the receiving unit 62 controls the ventilator from signals for turning on, to adjusting the speed of the blowers. The sensor(s) and receiver(s) may both have a transmitter and receiver to enable communication through signals. This would be helpful when changing set points or detection points.

In one embodiment, the remote sensing and receiving system or detecting and display system is configured as a remote keypad. For example, the keypad apparatus preferably includes a display and a remote transducer unit having a temperature sensor unit or other transducer exposed to the cook top/range.

As discussed, physical parameters measured by the remote sensing and receiving system are not limited to temperature. For example, a sensor/transducer may be used in extinguisher devices in which the quality of the air from a range is measured for CO, $CO_2$, or other gasses for fire fighting. Note: Transducer Technology, Inc. offers a T series carbon monoxide sensor using nano-particulate technology for sensing or an amperometric electrochemical sensor. In this embodiment, if a fire develops, the remote sensor and remote control devices can activate a fire extinguisher. Here, a microprocessor preferably controls the various circuits associated with this system. Various other devices may be coupled to such a microprocessor to control other functions within the appliance.

In another embodiment, a fire protection system may be included. See, e.g. FIG. 5, system 105. The fire protection system 105 preferably has a warning device and a built-in fire extinguisher. The fire detection system preferably also turns off the blower and other electronics and closes at least one vent through a control board. This feature prevents the spread of fire in and around the appliance. Further, critical temperature levels may be set by the factory so that when the sensors detect these present levels, the ventilator activates the fire protection system.

Another feature of the present invention is preferably the use of an output device or display 130 located, for example, on a sliding panel, a rotating panel, or popup panel 136 attached to the backing 29 of the appliance 15. See FIG. 13. In the rotating display shown, the display panel or screen is an LCD display 150. Input buttons 143a, 143b may also be present. This ability to conceal the display 130 protects it from damage and provides a smooth-looking surface. In one embodiment, this is accomplished by placing an electronic display on a rotating drum, a rotating L-shaped plate, or on a triangle-shaped part. Once the operations are complete, the user or the appliance 15 can rotate the display 130. In one embodiment, the user can touch the front of the display 130 to activate movement. Once the electronics sense the pressure on the display 130, the rotation begins until it reaches the stop point. In this case, the stop point would be when the unit provides the smooth surface. The other way the display 130 may move to a closed position is if the display 130 and the ventilator have been off for a time. Once that time has been reached, the display 130 returns back to the closed position. A motor or some other means of rotating the display 130 may be used to provide movement. Switches, stepper motors, or magnetism can be used for the location of stop points.

Figure 14:
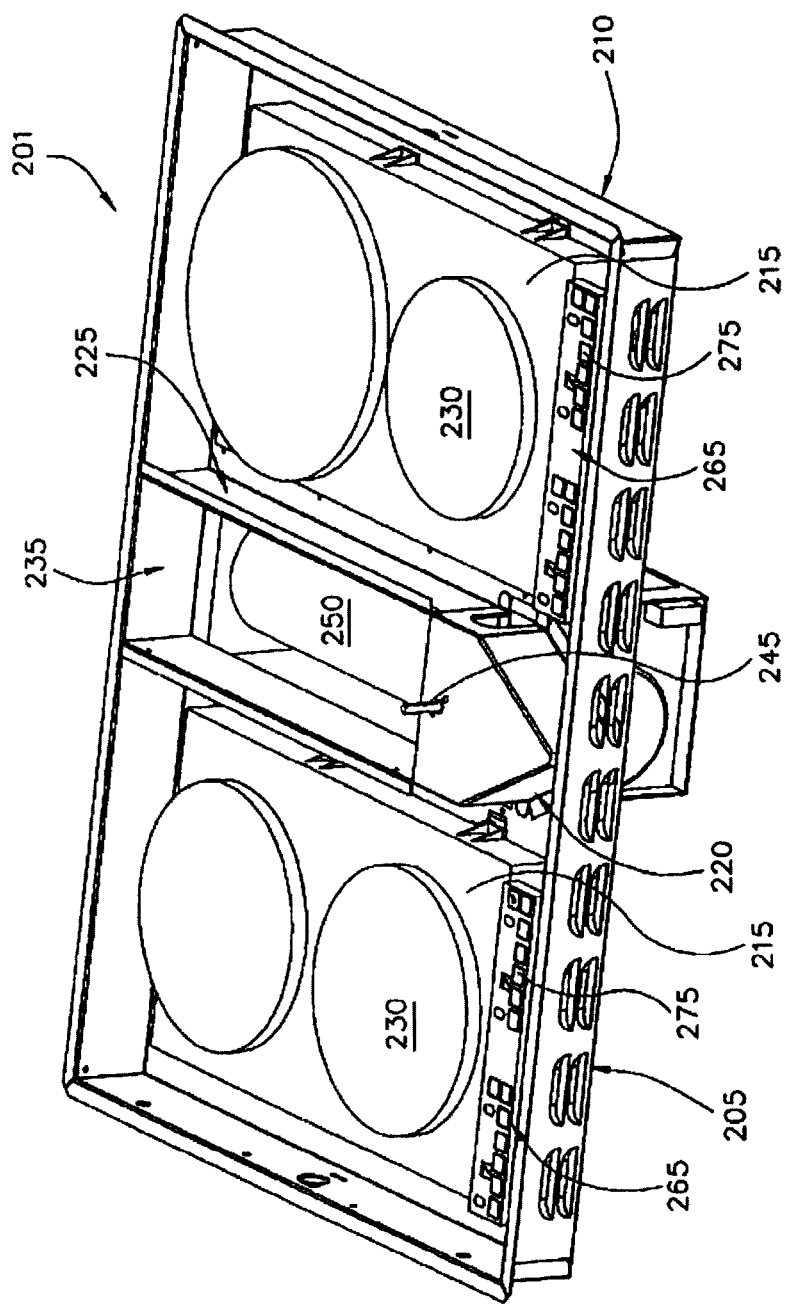
FIG. 14 illustrates a perspective view of yet another embodiment of the present invention with the glass top removed for clarity.

In one preferred embodiment shown in FIG. 14, louvers 205 may be added to the front of the cook top 210 of appliance 201 to draw air straight into an induction hob box 215. Further, an element serving to direct airflow, for example, a triangular-shaped member 220 could be added to the ventilator box 225 to taper it to a point in the front, yet still draw a large amount of air without necessarily interfering with airflow to and from the induction hob element 230. In this way, for example, the volume of air stays the same, but the velocity increases so as to give better cooling across the surface and from the hobs. Thus, such a V-shape is preferred because it essentially acts as a restriction point to increase airflow atop the hob units. The ventilator downdraft assembly 235 in this embodiment is preferably sealed off completely from this hob cooling system. A shaft 245 for the controls of a ventilator fan is also shown as is a tube fan housing 250 of the downdraft blower assembly 235. The burner element controls 265 are shown here as touch pad controls 275.

In another embodiment, one or more displays may be used to interface with the operator the functions, temperatures, speeds, need for a filter change, and time. For example, the controller may have a graphic specific to the design and function of at least one of the blower assembly (e.g., a small fan picture), lighting, and the ventilator (e.g., ventilator graphic) as shown in FIG. 8. Again, such controls are preferably mounted on at least one of a top, face, side, or other surface of the ventilator or cooking surface for easy viewing and use.

With reference to the present invention, FIGS. 15-25 show other possible designs of an indoor or outdoor induction cook top having a heat management system and systems heat control. This disclosure describes the integration of a smooth glass ceramic induction cook top, a heat management system, and the components required to overcome the inadequacies of other designs on the market.

The heat management system can be incorporated with a telescoping ventilator integrated into the smooth glass ceramic induction cook top for removal of contaminated air without affecting the airflow. Directing the heated air is crucial to maintaining uniform flow throughout the housing while maximizing the total air flow rate through the system. This helps to maintain generally uniform temperatures of the internal components regardless of the ambient air temperatures. This system can also incorporate a cross flow or centrifugal blower system.

The system preferably includes an electronic control system, which preferably communicates with sensors to monitor conditions, e.g., temperature, within the housing and makes adjustments accordingly, e.g., changing the fan speed or controlling an electronic cooling device. The electronic controls may be located within the housing, attached to the housing, or they may be remote from the housing, thus isolating the electronic controls from exposure to any increased temperature.

Figure 15:
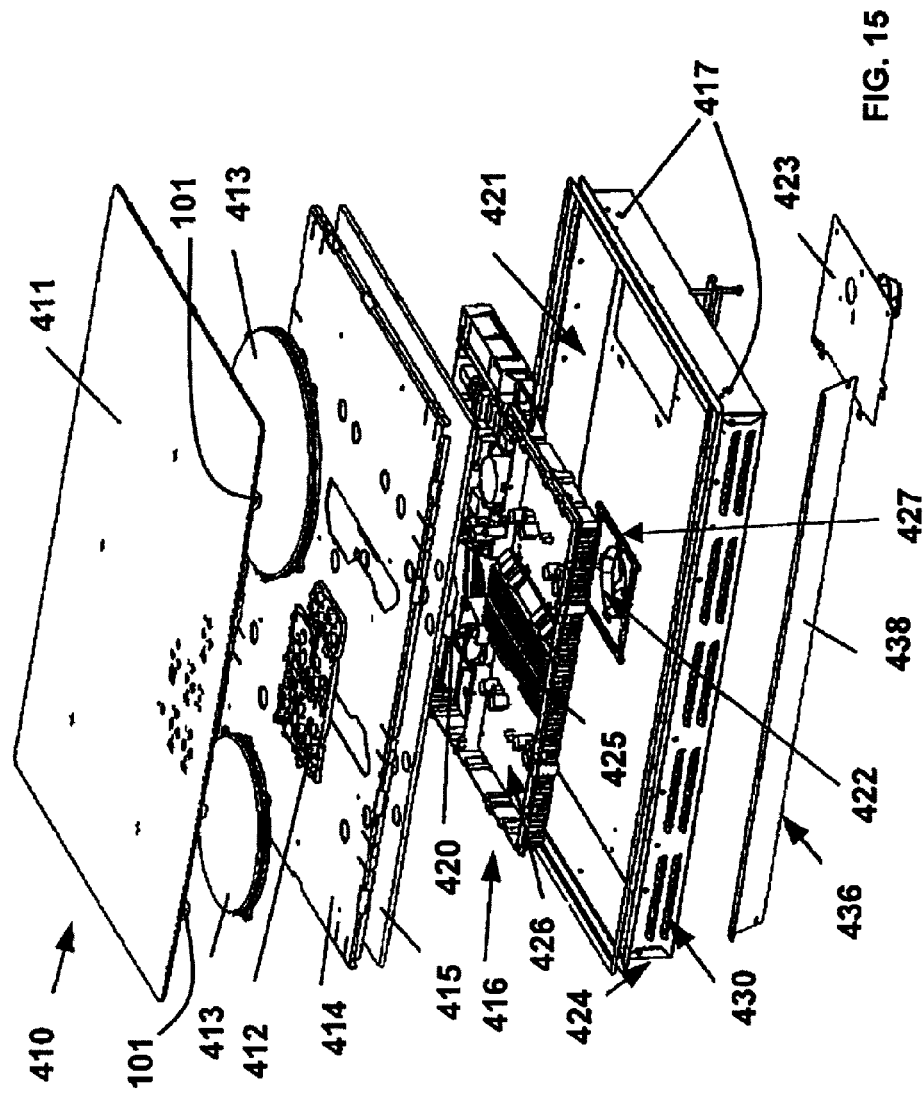
FIG. 15 is a perspective view of one embodiment of the cook top of the present invention.
Figure 16:
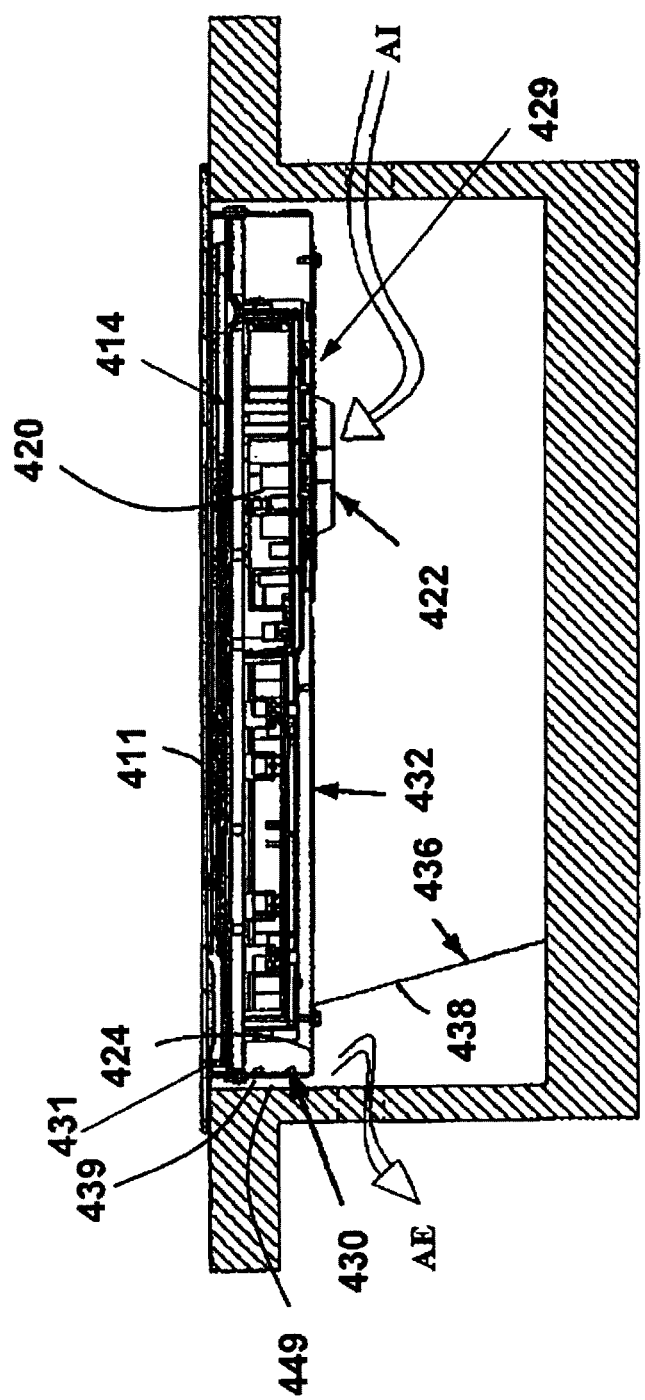
FIG. 16 is a side view of the embodiment of FIG. 12.
Figure 17:
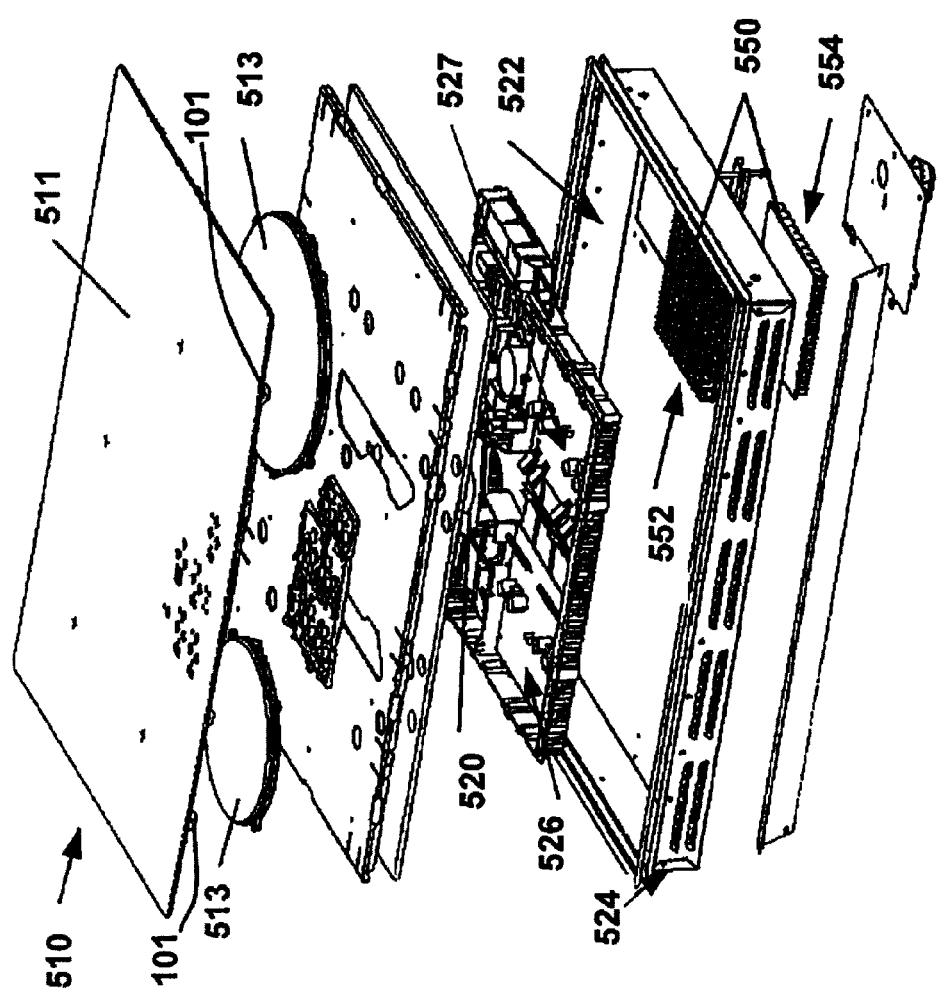
FIG. 17 is a perspective view of another embodiment of the cook top of the present invention.
Figure 18:
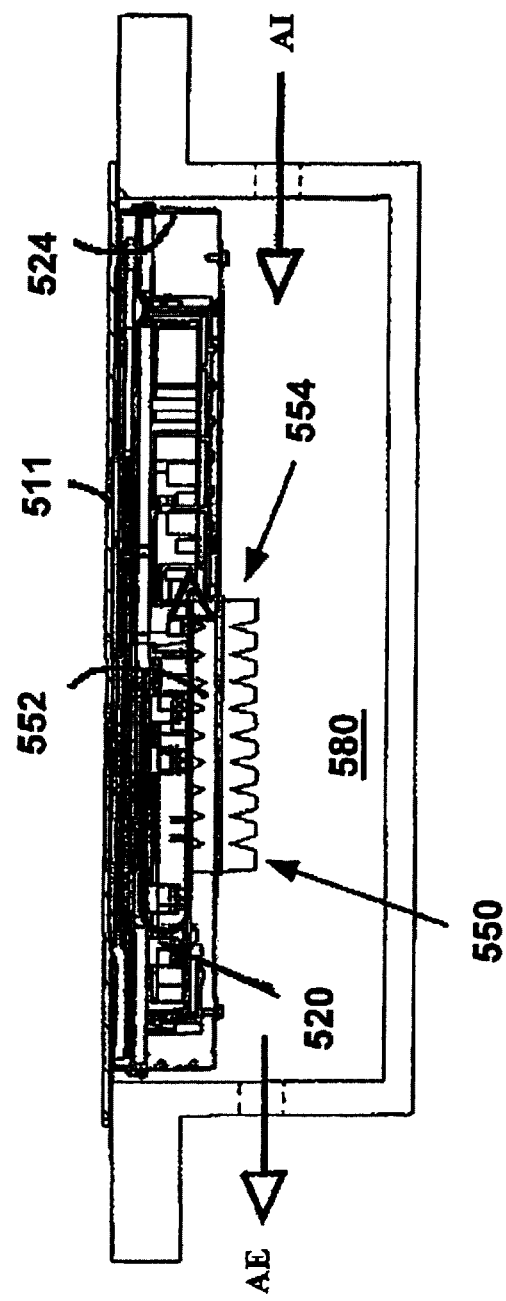
FIG. 18 is a side view of the embodiment of FIG. 14.

Referring to FIGS. 15-16, another preferred embodiment of an induction cook top 410 is shown. The induction cook top 410 preferably is comprised of a ceramic glass cooking surface 411, a touch board 412, inductor coils or induction hobs 413 located between the cooking surface 411 and a metal top plate 414, an insulating material 415, and an induction unit assembly such as an induction generator electronics assembly 416 assembled in a cavity 421 and mounted to a base which could include a chassis or housing 424. The housing 424 includes a series of bosses 417 spaced around the perimeter of the housing 424. The bosses 417 extend into the cavity 421 of the housing 424 and engage the metal top plate 414 from a height on the housing side surfaces that is in line with the metal plate. The bosses 417 position the metal top plate 414 within the cavity 421 such that an air gap 431 is formed between the housing 424 and the metal plate 414 improving air circulation within the cavity 421. The electronic control system is in communication with various components, e.g., a fan 420, induction generators 426, or a heat exchanger 425, and may be located on the touch board 412. The housing 424 preferably further comprises an air intake vent, for example, defined by an opening with a fan cover 422 having a gasket 427 extending substantially around its periphery, access panel 423, and outlet vents 430. The generator electronics assembly 416 preferably further comprises induction generators 426, the fan 420, and the heat/cooling exchanger 425. The fan 420 is connected to the lower surface of the metal plate 414 or insulating layer 415, and can be shielded with a fan cover and pulls ambient cooling air into the cavity 421 from the intake vent 422 and through heat/cooling exchanger 425. Cooling is important due to the increasingly larger watt output of induction generators 426 and the large amount of heat generated from the appliance/hobs 413.

Referring now to FIG. 16, in one preferred embodiment 410, the housing lower surface such as bottom or lower surface 432 has at least one opening 429 that accommodates intake vent 422 and a housing side 439 with at least one opening 449 that accommodates vents 430 such that air (AI) is drawn into the housing 424 through the opening 429 via intake vent 422 and expelled through the vent 430 in the side of the housing 439 by a fan 420 effectively forming a ventilation passage cooling the induction heating elements 413 contained in the passage. The induction cook top 410 of FIGS. 15-16 may have vent slots 430 below the counter for venting heat out of the housing 424. The air intake 422 may be located at the front or back of the bottom or lower surface 432 of the housing 424. Optionally, the air intake may be located in one of the sides 439 of the housing 424. Preferably, the air intake 422 is located opposite the venting slots 430. The intake 422 and slots 430 preferably are in communication with vents in a stand, cabinet, or island that supports the cook top. Thus, intake 422 and slots 430 can draw air from the outside.

As shown in FIGS. 15-16, incorporating an element serving as an airflow barrier system, e.g., a baffle, strip or barrier 436, onto the bottom 432 of the cook top housing 424 prevents exhausted air from re-circulating back into the cavity 421 where the hobs 428 are located, thereby preventing an increase of the temperature inside the housing 424. Multiple barriers 436 or vents 430 or alternative arrangements could be utilized. For example, the intake 422 of each fan 420 could be individually ducted or separated by barriers 436. The exhaust from multiple fans 420 could also be ducted or guided by barriers 436. The positioning of the barrier may vary, but preferably it is angled toward the intake 422, as shown in FIG. 16.

The airflow barrier system 436 mounted to the induction cook top housing 424 may prevent exhausted heated air from having a direct path back to the intake 422. More specifically, the barrier 436 extends downwardly and blocks the airflow from the exhaust 430. One type of barrier 436 could be a flip-down barrier on the bottom of the housing such that the barrier 436 can be folded up against the bottom 432 to provide a flat profile for shipping. This type of barrier 436 permits the barrier 436 to be adjustable to the depth of the area below the housing 424. Such adjustment capability provides the flexibility to install the cook top 410 in any cabinet and can provide for the varying depths or restrictions found in cabinets or locations. Alternatively, the barrier 436 may be a fixed or flexible barrier attached to the bottom 432 of the housing 424. The barrier 436 may also be a detachable barrier that attaches to the bottom 432 of the housing 424. In this case, the barrier 436 may be removed for shipping and installed during installation of the cook top 410.

The barrier 436 can be attached by any suitable means including, but not limited to, screws, hinges, slots, adhesive, or tape. The construction and design of the embodiment of FIGS. 15-16 address the known deficiencies of presently available induction cook tops that permit air to circulate back into the induction cook top housing 424 and increase the temperature levels therein.

Further, it should be noted that although a touch pad control is disclosed, electronic or mechanical knob controls could also be used as user interfaces.

Referring to a second preferred embodiment 510 of the inventive induction cook top shown in FIGS. 17-21, a cooling device such as an electronic cooling device 550 is used to provide cooling to an induction cook top surface 511. The electronic cooling device 550 may be any suitable device, e.g., a forced convection cooler, an electronic heat sink, brazed gain convergence device, a thermoelectric cooling device, a cold plate or plates, electronic heat pipes, a copper spreader, thermal vias or a low profile electronic fan heat sink. Preferably, the electronic cooling device is a thermoelectric cooling device such as a solid-state heat pump 550, which operates by the Peltier effect whereby heat is transferred via the flow of current through a thermoelectric device 550. A first portion 552 (i.e., the "cold side") of the thermoelectric device 550 absorbs heat in the housing 524, thereby reducing the temperature. A second portion 554 (i.e., the "hot side") dissipates the heat into the ambient air, typically, the undercounter space 580. Forced air fans 558, 560 may be used to move the air over both the hot side 554 and cold side 552 of the thermoelectric device 550. The thermoelectric device 550 has no moving mechanical parts so they are extremely reliable with an almost unlimited life span. No maintenance is required, except for the fans. Static construction makes the thermoelectric device 550 immune to vibration thus allowing it to be placed in any orientation. A thermoelectric heat device 550 does not contain any CFC or other gases and has a compact and simple structure. The preferred cook top 510 contains one or more thermoelectric devices 550. As shown in FIGS. 19-20, the electronic cooling device may be mounted externally to the housing, see FIG. 16, or through-mounted. See FIG. 20.

Figure 21:
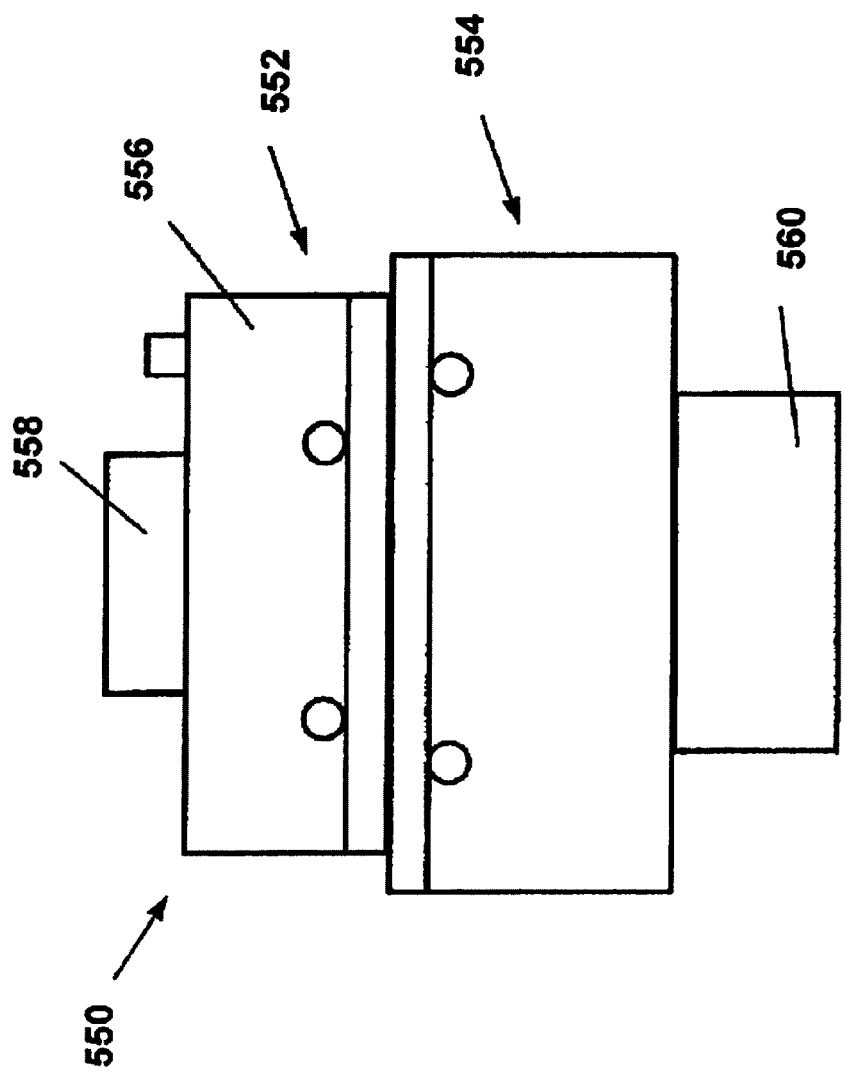
FIG. 21 is a side view of an electronic cooling device that may be used with the cook top of the present invention.

A preferred electronic cooling device 550 is a through-mount thermoelectric device produced by Melcor, model number MAA600T-24. See FIG. 20 for an example of a through-mounted electronic cooling device. Alternatively, a unit produced by INB Thermoelectric Products could be utilized. As shown in FIG. 21, the cold side 552 of the module 550 is connected to a heat sink 556 with a fan 558 for forced convection that absorbs heat from within the enclosure 524 while circulating the cooled air. The warm or hot side 554 of the thermoelectric device 550 may be connected to the same fan or another forced convection fan 560 that dissipates the heat absorbed through the cold side 552 as well as the input power to the module or modules to the ambient. This thermoelectric device 550, or TEC, is a solid-state heat pump that utilizes the Peltier effect to provide cooling. The assembly components are comprised of a p-type semiconductor, an n-type semiconductor, an electrical insulator (ceramic or other non conductive material types), electrical conductors (copper), and two lead wires (one negative (−) and one positive (+) lead wire connected to the assembly to provide current to this assembly). Thermoelectric devices have only recently become practical for this application due to the development of the semiconductor thermocouple materials stated above. The use of bismuth telluride, a quaternary alloy of bismuth, tellurium, selenium, and antimony, doped and processed to yield oriented polycrystalline semiconductors with anisotropic thermoelectric properties are preferably used. Other materials are being developed for this type of cooling with the ability to change current flow and provide heating.

With the use of an electronic cooling device 550, e.g., a thermoelectric cooling device, a closed loop system may be used to keep the internal cabinet air isolated from the heated ambient air. The removal of external fans would decrease the noise level of the cook top 510. Some of the features of the thermoelectric device 550 are cooling to 78° F. below ambient, maintaining ambient temperatures while removing up to 640 BTU/Hr in the housing 524, and precision temperature control with a closed loop temperature controller 527 that sends a control signal to the cooling device 550. As stated, an electronic cooling device 550 eliminates the exchange of air between the housing 524 and the ambient air space 580. Additionally, multiple electronic cooling devices 550 may be arranged, e.g., cascaded, to provide greater cooling, if needed. This is especially important given the projected demand for higher wattage output from the induction hobs 513. Burner elements having at least 5,000 watts and up to 9,000 watts output are anticipated in future generations of induction cook tops, resulting in a significant increase in heat generated by the hobs 513.

In another embodiment, the bottom 432 of the housing 424 may be connected with thermoelectric wiring so that the bottom 432 may function as a cooling plate. In such a configuration, the internal fan for circulating cool air throughout the housing 424 may be eliminated. However, it is still preferable to have an external fan for moving heat away from the housing 424.

In sum, the embodiment of FIGS. 17-21 is an induction cook top 510 that uses an electronic cooling device 550. Electronic forced air-cooling systems such as the thermoelectric device 550 provide compact, lightweight cooling systems for enclosures in harsh environments. These air-to-air exchangers are relatively new to the market and have only been used for certain applications, e.g., cooling computers. Recent developments in the field of semiconductor thermocouple materials have made these devices more practical. Electronic cooling devices have no moving parts and only need a fan 520 to force cooled air into the induction cook top housing 524. Electronic cooling devices 550 are extremely reliable and provide an extended life span for the cook top 510.

In another embodiment, an external electronic forced air cooling blower system may be synced with the operations of the electronic control system when operating the appliance 510. The electronic control system responds by turning on the thermoelectric device 550 without user interaction. The electronic cooling device 550 may remain on until proper levels and/or temperatures are reached, even after the cooking unit is turned off. As stated, thermoelectric devices 550 provide low noise level. Thus, because the thermoelectric device 550 is externally mounted, the main housing 524 noise is substantially reduced. These devices provide precision temperature control, quick cooling to below ambient temperatures, reduced space, size and weight, reliable solid-state operation with no sound or vibration, and can also provide heating. The devices can be mounted by many methods and is not limited to the single description given here.

As shown in FIG. 21, the electronic cooling device 550 in one embodiment may be equipped with one or more fans 558 to help move cooled air through the housing and heated air away from the cook top. The fans 558 may be secured to the housing 524 using any suitable fastener, e.g., bolts, screws, adhesives, rivets, and clips. In this arrangement, the thermoelectric device 550 provides cooling air inside the housing 524 and removing the heat at the bottom. Thus, using a thermoelectric device may eliminate the need to exhaust air from the housing 524, thereby eliminating the need to vent air out through slots.

As discussed in further detail below, sensors having the ability to detect temperature and backpressure in the exhaust stream may be used in conjunction with the cook top of the present invention. If a blockage or extreme heat is sensed in the house discharge vent, the sensor may communicate with the electronic control system to increase fan speed to maintain the proper volume of extraction and thus overcome the increased heat load. This prevents the shutdown of and/or damage to the generators 526 and exposure of the electronics to excess heat generated, and it also preferably keeps the cooking surface at a lower temperature. Many types of sensors may be used for detecting and controlling the speed of the forced air-cooling fan/blower supplying cooled air to the housing 524. For example, airflow sensors can be used for detecting the proper temperature of the flow of air internal in the cavity 522 of the induction housing 524. Such a sensor measures the airflow and provides a signal to the electronics to increase or decrease the cooling air to maintain a desired temperature, i.e., a temperature that cools the generators and other components while providing increased efficiency of the induction hobs 513.

Figure 22:
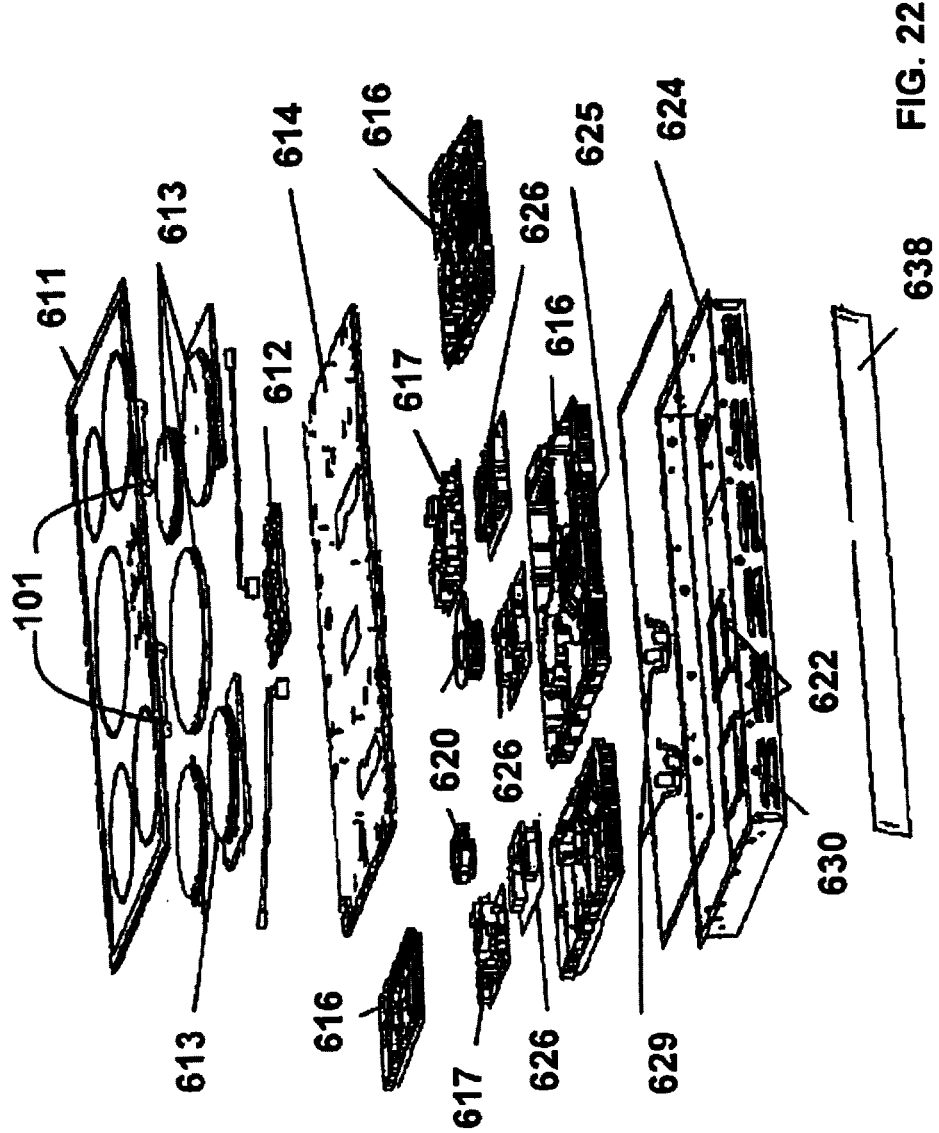
FIG. 22 is a perspective view of another embodiment of the cook top of the present invention.

Another possible embodiment of the cook top of the present invention includes the embodiment of FIG. 22. The preferred dimensions for the cook top shown in FIG. 22, which preferably contains five hobs 613, are as follows: the glass surface having a length of about 36 inches and a width of about 30 inches, the housing having a length of about 34 inches and a width of about 19 inches. However, these dimensions may vary as desired.

The embodiment of FIG. 22 has a housing 624 with two intake vents 622 on the bottom of the housing 624 and a series of outlet vents 630 in the sidewall of the housing 624. The housing contains two induction generator electronic assemblies 616, each of which comprises a fan 620, at least one induction generator 626, a heat exchanger 625, and a filter board 617. The fan 620 may be fitted with a fan cover 629. The fans 620 preferably are positioned to align with intake vents 622, respectively. There is a metal top plate 614 positioned over the housing 624. The inductor coils 613 are positioned between the metal top plate 614 and the cooking surface 611. Also between the metal top plate 614 and the cooking surface 611 is a touch board 612, which allows the user to control various operations of the cook top.

Preferably, below the housing 624, there is a barrier 638 that is positioned to substantially prevent heated air exhausted from the outlet vents 630 from being drawn back into the housing 624 through intake vents 622. The barrier 638 is preferably positioned so as to separate the intake vents 622 from the outlet vents 630. The barrier 638 may be integral with the housing 624, or it may be a separate piece attached using any suitable means, e.g., screws, bolts, adhesives, and glue.

Figure 23:
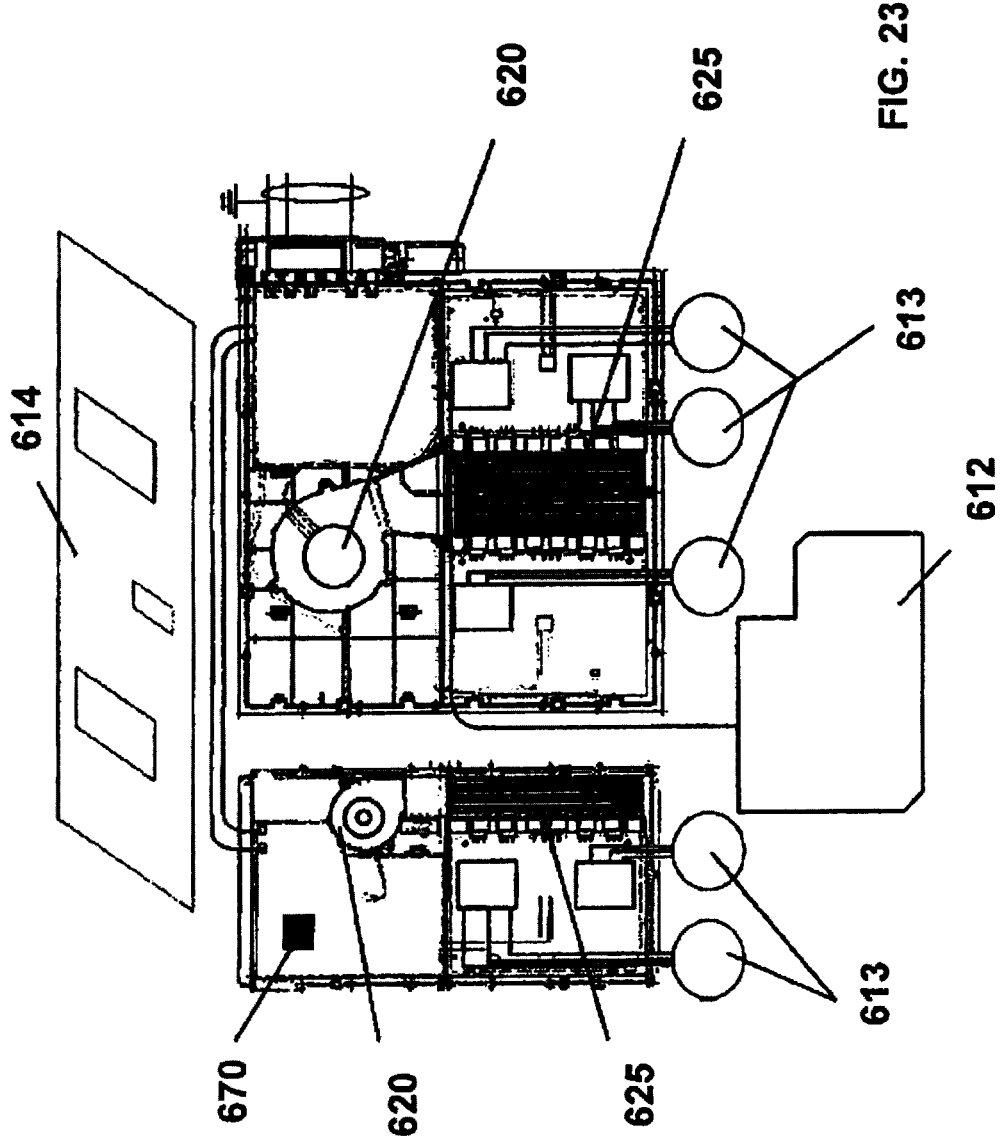
FIG. 23 is a schematic of an electronic control system that may be used with the embodiment of FIG. 22.

FIG. 23 is a schematic of an electronic wiring system that may be used in conjunction with the induction cook top of the present invention, preferably with the embodiment of FIG. 22. As shown in FIG. 23, the touch board 612 may house the electronic control system that controls the cook top. Additionally, there is a sensor 670 for sensing a condition within the housing that is in communication with the electronic control system, which may respond to the information provided by the sensor 670 accordingly, e.g., by turning on the fan 620 to cool the housing 624. The sensor 670 may be any one of a variety of sensors, as discussed in further detail below.

Figure 24:
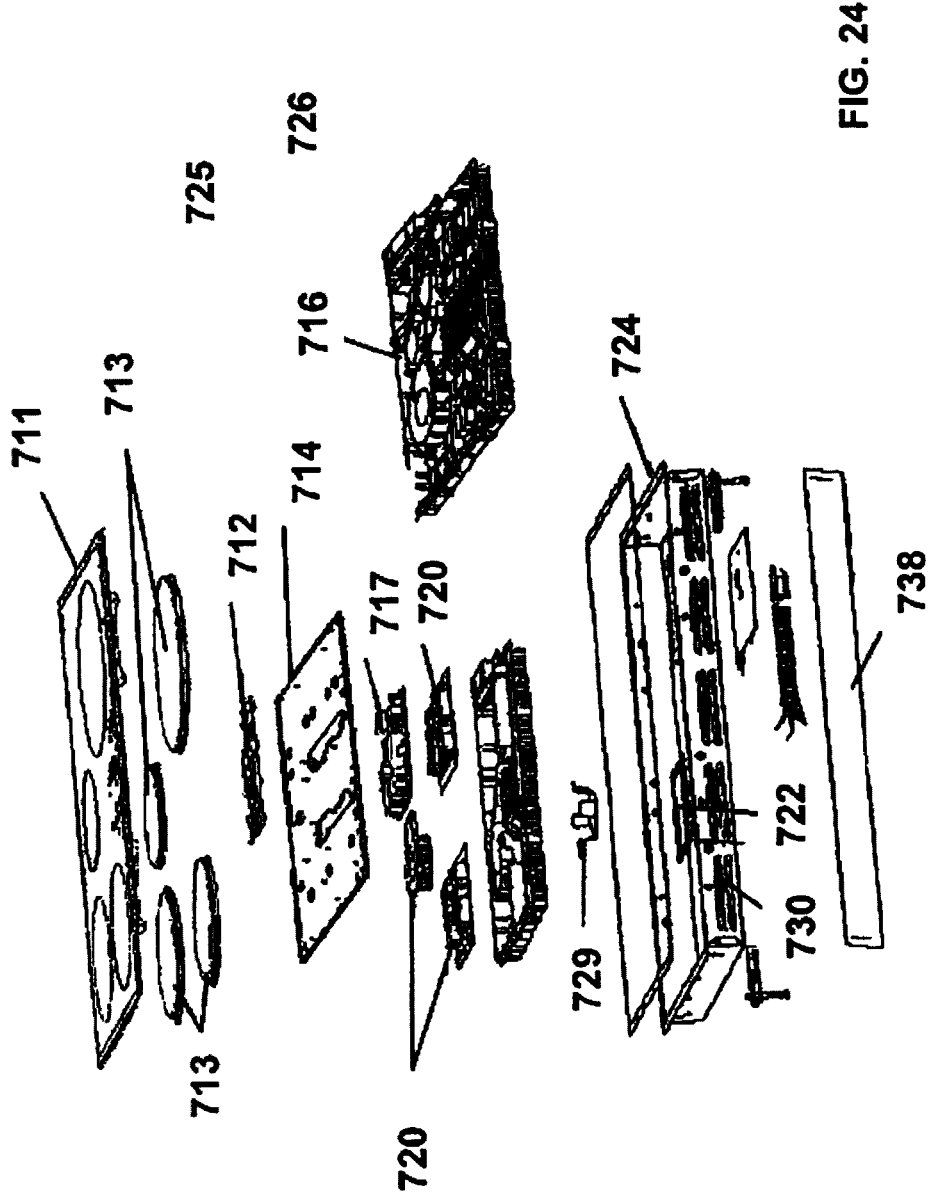
FIG. 24 is a perspective view of another embodiment of the cook top of the present invention.

FIG. 24 shows another embodiment of the cook top of the present invention, which preferably contains four hobs 713. The embodiment of FIG. 24 has a housing 724 with an intake vent 722 on the bottom of the housing 724 and a series of outlet vents 730 in the sidewall of the housing 724. The housing 724 contains an induction generator electronic assembly 716 that comprises a fan 720, at least one induction generator 726, a heat exchanger 725, and a filter board 717. The fan 720 may be fitted with a fan cover 729. The fan 720 preferably is positioned to align with intake vent 722. There is a metal top plate 714 positioned over the housing 724, and the inductor coils 713 are positioned between the metal top plate 714 and the cooking surface 711. Also between the metal top plate 714 and the cooking surface 711 is a touch board 712, which allows the user to control various operations of the cook top.

Preferably, there is a barrier 738 adjacent the housing 724 that is positioned to substantially prevent heated air exhausted from the outlet vents 730 from being drawn back into the housing 724 through intake vents 722. The barrier 738 is preferably positioned so as to separate the intake vent 722 from the outlet vents 730.

Figure 25:
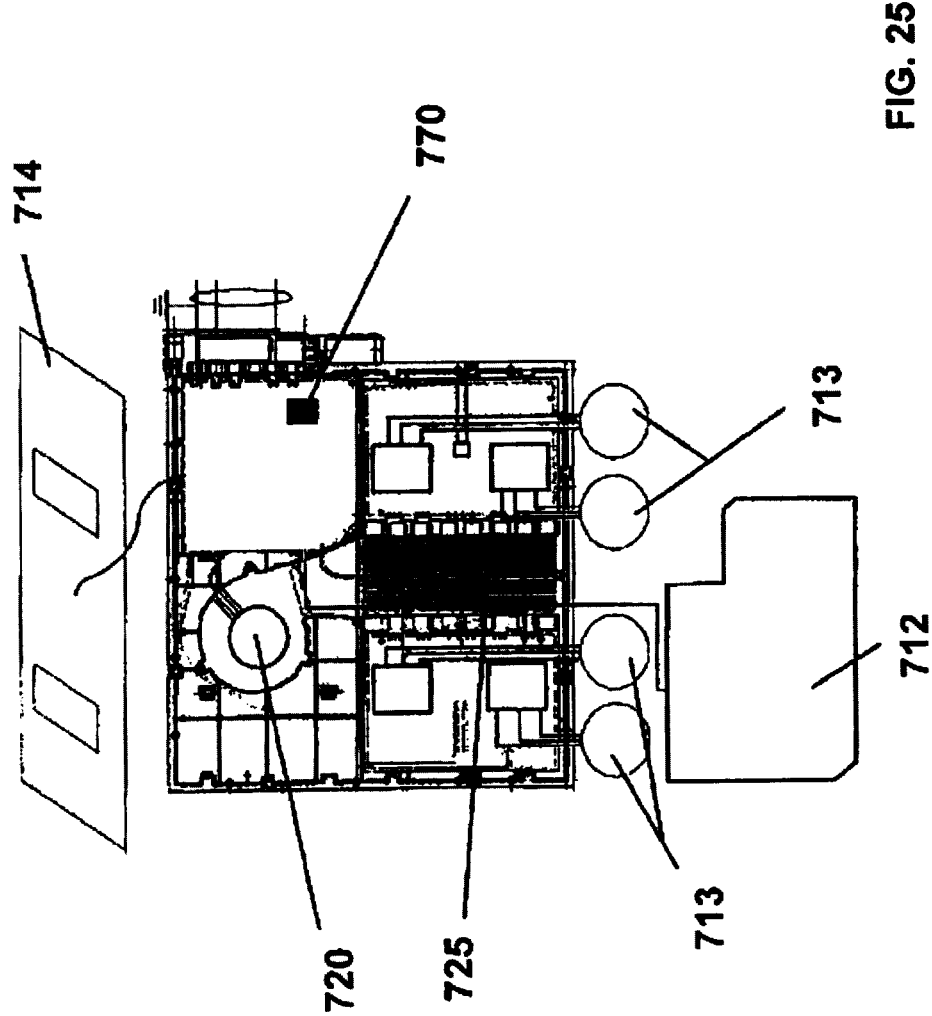
FIG. 25 is a schematic of an electronic control system that may be used with the embodiment of FIG. 24.
Figure 26:
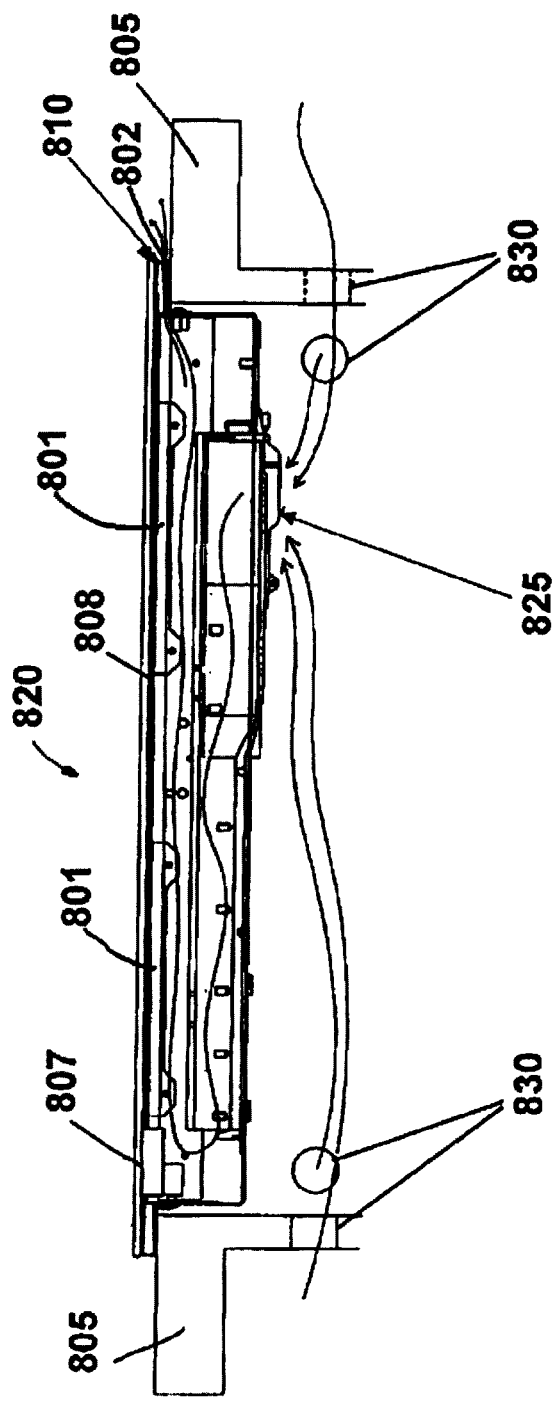
FIG. 26 shows yet another embodiment of the present invention.

FIG. 25 is a schematic of an electronic wiring system that may be used in conjunction with the induction cook top of the present invention, preferably with the embodiment of FIG. 24. As shown in FIG. 25, the touch board 712 may house the electronic control system that controls the cook top. Additionally, there is a sensor 770 for sensing a condition within the housing 724 that is in communication with the electronic control system, which may respond to the information provided by the sensor 770 accordingly, e.g., by turning on the fan 720 to cool the housing 724. The sensor 770 may be any one of a variety of sensors as discussed in further detail below.

The induction cook top of the present invention may further include a user interface that is in communication with the electronic controls. Preferably, the user interface is an electronic touch pad, e.g., tactile, membrane, piezo, capacitance, resistance, induction, and electronic touch control. The user interface may be made of glass, metal, or plastic.

Construction

With reference to the present invention, the embodiments discussed above use various technologies and principals of physics to control the heat generated by the electronic controller, mechanical controls, and the induction generators, provide precise temperature control and an efficient way of removal of heat over present induction cook tops on the market. Preferably, the embodiments use a smooth ceramic glass cook top. The induction hobs are preferably sandwiched in between the glass and a metal housing in any combination. The reduction of a number of components, the elimination of generated heat, the reduction of noise, and an increase in performance are all features of both embodiments of the present invention. In a preferred construction the cook top is a drop-in cook top in a counter top without the need for venting above the counter. This invention generally provides the ability to pass the UL heat requirements tested in UL858, UL858A, or similar standards.

Construction materials both for the induction cook top components can range from metals, glass, stone, transparent materials, or manmade materials. The preferred design for a bottom barrier 436 is made of a metal having thin thickness with a folded edge making a member or flap 438 for mounting to the bottom or lower surface 432 of the housing 424. The flap 438 extends away from the housing 424, thereby blocking the airflow from the exhaust 430 and the intake 422 from having a direct path. Thus, the barrier 436 acts to substantially disrupt the exhaust air from re-entering the housing 424 and permits more cooling air to enter the intake 422. In one preferred embodiment, the flap 438 is pivotally connected to the lower surface of the housing 424 such that it may lay generally flat against the lower surface 432 of the housing 424 or hang down generally perpendicular to the lower surface of the housing 424.

Fixed or Telescoping Ventilator

With the induction cook top of the present invention, a fixed or telescoping down draft ventilator may be integrated into the smooth glass cooking surface. Examples of such ventilators are disclosed in U.S. Publication Nos. 2006/0278215 and 2007/0062513, which are expressly incorporated by reference herein. As one skilled in the art would appreciate with this invention, a downdraft ventilator would not affect the required airflow for cooling the induction generators, electronics, and cavity. Because of the various constructions, operating methods, and designs disclosed for the present invention, a limitless number of designs, features, appearances, elevations, styles, operations, sensing, and performances may be implemented for both fixed and telescoping downdraft ventilators. With the ability to properly seal and isolate the downdraft air flow from the generator cooling air flow, the downdraft may be placed in various locations and different configurations affording users the advantage and benefits offered by other products using fixed or telescoping downdrafts. Thus, the downdraft ventilator could be any suitable shape or design, such as flush, telescoping, round, square, or rectangular. Additionally, the ventilator system may be automatic (no user interface), semi-automatic (limited user interface), or manually controlled.

In addition to the drop-in style, the induction cook top system of the present invention may be a slide-in type cook top, with or without ventilators and/or telescoping units. The cook top of the present invention may be used in multiples, e.g., side-to-side or back-to-back, for large cooking areas, e.g., a large cooking island. The cook top further may be integrated into any free-standing range, barbeque, grill, or other appliance. Further, it may be integrated into a cabinet, counter, island, wall or mobile unit. Such a system also may be constructed using materials such as metal, glass, stone, or any variety of manmade materials.

Forced Air Cooling System

In accordance with one aspect of this invention, an induction cook top is provided with a fan or blower and a cooling element, e.g., a thermoelectric device, in communication with the fan. The cooling element provides improved heat control to a non-ducted induction cook top secured to the inside of the cavity or remotely to circulate the cooled air throughout the housing and over the components. Circulating air over a cooling source may reduce and/or eliminate an increased temperature of the housing during use. Effective cavity temperature management can be accomplished and even improved by eliminating large temperature flows from entering the cooking area of the room. A fan or other device for moving air may be used to move air inside the housing, which may allow for humidity control within the housing, e.g., by power venting or condensation using a cooling source such as a thermoelectric device. A variable speed fan motor may be mounted inside or outside the cavity and may provide a variety of air flow patterns as desired to account for conditions within the housing, e.g., to remove moisture or adjust the internal temperature. Additionally, a sensor, e.g., for detecting current, voltage, or resistance, may be used in conjunction with the fan motor to control the air flow in the system. The forced air cooling system may be synced with the operations of the induction controls so that the cooling blower may be automatically operated when operating the appliance to maintain the desired temperature within the housing of the cook top.

Sensors

Generally speaking, the system may feature any variety of AC or DC powered electronic, mechanical, or electromechanical sensors used to detect a condition in the housing, e.g., temperature, resistance, magnetic field, or current in order to control the ventilator for heat management within the cook top appliance. Further, a sensor may be used for detecting and controlling the speed of the forced-air cooling fan for supplying cool air to the housing of the cook top.

According to one aspect of the present invention, a temperature sensor may be used with the induction cook top of the present invention to detect airflow temperatures, which may improve the overall functioning of the cook top and its components. For example, a temperature sensor may be located in the housing, and it may communicate with the electronic control system to detect the temperature and movement of air passing by the sensor. See FIGS. 23 and 25. A limit may be set with respect to the air temperature. Accordingly, when the temperature is above the limit, the electronic controls may facilitate the intake of air into the housing to cool the various components of the induction cook top. The limit may be adjustable based on the nature of the components in the cook top, e.g., for various types of induction hobs the BTU output may increase, thus requiring a greater degree of cooling. In another configuration, the electronic control board sets the temperature limits automatically, e.g., based upon a percentage relating to the efficiency of the system.

The sensors for temperature airflow may include simple, low cost models such as, e.g., a thermocouple, as well as complex signals that communicate with the electronic control board. If the sensor detects a blockage, e.g., by detecting a reduction in the airflow, the sensor may communicate with the electronic control system, which may increase the airflow and adjust the temperature. Additionally, the user may be notified, e.g., by sound, by lights, or by system shutdown. The user also may be notified if the system is malfunctioning, e.g., by system shutdown or various combinations of signals.

In accordance with another aspect of this invention, an induction cook top is designed to be controlled by electronics and equipped with an electronic temperature sensor located inside or on the cook top, within the housing, or in the top trim such that the temperature inside or on the cook top can be accurately detected. The system may include an AC or DC electronic heat/temperature sensor, which may provide improved control and operation response such as sensing the temperature in the cook top housing and then having the electronics control the exhausting and cooling functions and blower speed.

A variety of other sensors may be used in conjunction with the present invention, such as Resistance Temperature Detectors (RTD), thermistors, IC sensors, Radiation Sensors Thermometers (RST), bimetallic, IR and thermocouples. Preferably, the sensor is an RTD, which may be a less expensive sensor. An RTD may be relatively slower in response than other sensors, e.g., a thermocouple, but an RTD offers several advantages. For example, an RTD is inherently stable and generally resistive to thermal shock, thus avoiding errors that may occur in other sensors under similar conditions. This feature may be important when storing the product and transporting it to the end user. Another advantage of an RTD is that it does not require a special compensating lead wire or cold junction compensation. The operation of an RTD is generally based upon the electrical resistance of certain metals that increase and decrease in a predictable manner in response to a change in temperature. The most commonly used metals for an RTD are platinum, copper, and nickel. These metals are preferred because 1) they are available in near pure form, which is important to insure consistency in manufacturing process, 2) they offer a very predictable temperature/resistance relationship, i.e., it is substantially a linear relationship, and 3) they can be processed into extremely fine wire.

During operation, the sensor produces a signal and communicates the signal to a conditioning device, e.g., a transmitter. This transmitter is used to convert the signal from the sensor to an electrical signal that is recognizable by the electronic control board. Temperature transmitters may include various configurations such as a four-wire, three-wire, or a two-wire circuit, but other methods can be used. Preferably, the connection between the RTD and the transmitter is a four-wire circuit. For example, this configuration may remove potential error that may be caused by mismatched resistance of lead wires. Specifically, a constant current is passed through each of the lead wires and a measurement for the voltage drop across the RTD is determined. With a constant current, the voltage is strictly a function of the resistance and an accurate measurement may be achieved. Thus, this method may provide a high degree of accuracy in detecting the temperature in the housing cavity of the induction cook top.

Preferably, the system also includes circuitry that provides data/information to the electronic control board. For example, as discussed above, the circuit may have an RTD to measure temperature in the housing. The information, e.g., the conditions in the housing, may be displayed to the user on an output display. After user input, the information may be processed by the electronic controls, which may then make adjustments accordingly, e.g., increasing or decreasing the fan speed, or changing the settings of a thermoelectric device. Alternatively, the control may be automatic, e.g., the electronic control system may control the thermoelectric cooling system without user input. Such a circuit may be contained on a chip, which may be placed in any desired suitable for detection of the temperature within the housing.

Another sensor that may be used is a distributed temperature sensor (DTS). A DTS is a fiber optic distributed temperature sensor that senses temperature along an SS sheathed fiber, and it may feature a resolution of 0.5° C. and a spatial resolution of 1.5 m. A DTS fiber may range up to 2,000 m in length and may be coiled at specific points as desired. The fiber of a DTS may be sheathed with a nonconductive polymer for intrinsic applications, which may provide the ability to create a profile of the housing for detection of temperature within the housing. A DTS allows for detection of the temperature at many locations within the housing. The DTS, which may be contained on a strip, may be placed at any suitable location within the housing, e.g., along the bottom or top of the housing. Another advantage of a DTS is that the response time is shorter than with other sensors, which may enable the control board to control the temperature within a large portion of the housing. Additionally, the manufacturer may customize detection zones throughout the housing, as desired, without using additional sensors for detection.

Outdoor Use/Design

In accordance with another aspect of this invention, the induction cook top with a heat management system and systems heat control may be used in outdoor locations. As discussed above, the cook top may further be equipped with an integrated downdraft or telescoping ventilator using cross flow or centrifugal blower technology having the ability to weather the outdoor temperatures and environment. The use of a thermoelectric device for heat management may be better suited for outdoor use because, as detailed above, vents are not required, i.e., the housing will not be directly exposed to the elements. Moreover, a thermoelectric device may be better suited for outdoor use and potential exposure to extreme temperatures and weather conditions because a thermoelectric device does not have mechanical moving parts that may fail under such conditions. Additionally, a thermoelectric device may provide heat to the housing by reversing the current. Such a feature may be needed in cold climates when used outdoors to maintain an efficient temperature for the cook top to operate, particularly when first turned on. After the internal components reach a desired temperature, the thermoelectric device may then be used for cooling.

Installation

As discussed briefly above, the cook top of the present invention may be installed in a variety of structures, for example, above a cabinet or with a warmer drawer or wall oven. Therefore, many methods of installation are possible. However, for the sake of illustration, one method of installation above a cabinet is further described below.

Before installing the cook top, an installer should prepare an opening into which the cook top is to be inserted. For example, for a 36-inch model cook top, in one preferred counter top installation, the opening is preferably about 34 inches by about 19 inches, with the opening positioned at least about 2 inches from the rear wall and at least about 2½ inches from the front edge of the counter. Additionally, the following clearances are preferred: at least about 30 inches from the top of the cook top to any overhead items, e.g., cabinets; at least about 2 inches between the side of the cook top and any walls; at least about 12 inches of clearance beneath the cook top. Additionally, surrounding items, e.g., cabinets, may be insulated for protection from elevated temperatures. If the cook top is being installed above cabinet doors, there should be a clearance, preferably at least about 12 inches, between the bottom of the cook top and the drawer. A false drawer front may be used below the cook top, if desired.

The following method may be used to install the cook top in a counter. First, place a towel or tablecloth on the counter top near the opening where the cook top is going to be installed. Then, place the cook top face down on the towel. Then, for embodiments wherein the barrier is transported separately from the cook top, attach the barrier 36 to the cook top, e.g., using screws. Next, apply a seal, e.g., foam tape, around the outer edge of the glass surface of the cook top. Then, insert the cook top into the opening in the counter and align the cook top in the opening, as desired. Then, the cook top may be secured to the counter top, e.g., by using brackets 101 and screws (not shown).

A bracket 801 or frame member attached to the bottom side of the cooking surface 808 also may be present to provide spacing or holes 802 between the counter top 805 and glass cooking surface 807 and add yet another possible venting point 810. See, e.g., the cook top 820 embodiment shown in FIG. 26. A fan 825 and intake 830 are also shown.

There are virtually innumerable uses for the present invention, all of which need not be detailed here. For example, the cook top disclosed herein may be used in a side-to-side, back-to-back, or other configuration for serving as part of a larger, expandable cooking area. Of course, this and all of the other disclosed embodiments can be practiced without undue experimentation.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept. In addition, the individual components need not be fabricated from the disclosed materials, but could be fabricated from virtually any suitable materials. For example, construction materials for the cook top, the downdraft, and blower are at least one of metal, glass, stone, a transparent material, tile, plastic, and manmade material.

Moreover, the individual components need not be formed in the disclosed shapes, or assembled in the disclosed configuration, but could be provided in virtually any shape, and assembled in virtually any configuration. Further, although various components as described herein as physically separate modules, it will be manifest that they may be integrated into the apparatus with which they are associated. Furthermore, all the disclosed features of each disclosed embodiment can be combined with, or substituted for, the disclosed features of every other disclosed embodiment except where such features are mutually exclusive.

Various alternatives and modifications are contemplated as being within the scope of the following claims particularly pointing out and distinctly claiming the subject matter regarded as the invention. Many changes and modifications could be made to the invention without departing from the spirit thereof. The scope of these changes will become apparent from the appended claims.

Figure 28:
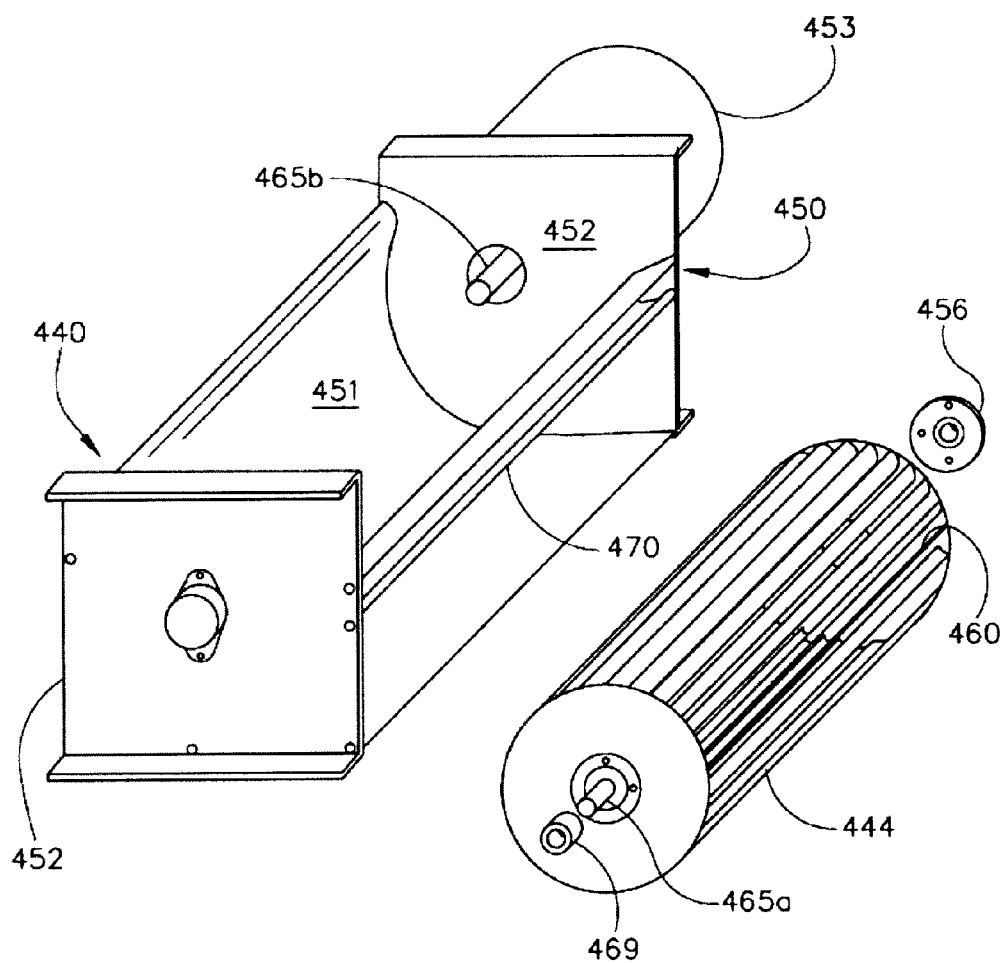
FIG. 28 shows a partially exploded view of an embodiment of a blower fan and housing according to the present invention.

Referring more particularly to FIG. 28, a preferred embodiment of a blower fan assembly 440 and fan or impeller 444 is shown. In general, with a crossflow/tangential fan or blower, the air is drawn in over the entire length of the fan impeller. Inside the impeller the airflow is diverted and accelerated by the vortex created by the rotation of the impeller. The air stream then exits over the entire length of the impeller on the discharge side. At the narrowest point between the impeller and the vortex creator, the intake and discharge side of the fan is separated and, together with the fan rear guide wall directs the airflow crossflow/tangential (impellers, e.g.) wheels are usually more efficient when a focused flow of air is required to cool or heat an immediate space such as the cook top. When used in this manner, the air does not have to travel long distances, but instead is used in the immediate surroundings such as in stoves or on a cook top.

One of the reasons that crossflow/tangential wheels are quieter in comparison to a centrifugal-style blower is that for products with the same CFM rating, the air speed of the tangential wheel is much slower since the outlet area is much larger than that of a centrifugal blower. This can be seen as an advantageous feature, because the large area of discharge of the tangential blower does not require additional diffusion. Diffusion areas create losses and decrease efficiency. Reduced noise is a highly sought after feature for kitchens due to the user using the kitchen as a central meeting point in a home. Crossflow blowers may be retrofitted to existing systems after older, less efficient blower assemblies have been removed.

Moreover, when compared to double inlet wheels used in a double blower, tangential impellers will generally provide an equal or slightly increased CFM with the same motor. The airflow is tangentially across the inlet area and tangentially out across the discharge area. The most efficient configuration is when this 90-degree change in direction can be utilized in the design of a product. The flow principle allows the air intake of the blower to take place over the whole length of the outer impeller periphery. The air then flows into the impeller interior where it is reversed and accelerated by the vortex, which is caused by the impeller rotation (acceleration due to the turning of the blades). Finally the air is distributed at the discharge side or bottom and any where in between over the whole impeller length. In this way, the air flows through the impeller first from outside to inside and then from inside to the outside. The impeller is typically a cylindrical cage of forward curved impeller blades with two or more supporting discs, i.e., the so-called "wheel". Here the vortex separates suction side and discharge side at the narrowest line between impeller and vortex and causes the flow pattern together with the scroll.

Ideally, if filters or coils are involved, tangential blowers are best used in a pull-through rather than a push-through manner. The inlet air speed is over a larger surface and, therefore, is lower than the discharge airspeed. This usually contributes to lowering the static in the system as well. Crossflow/tangential wheels do best in low-static situations, so it would be a good idea to try to minimize the static in a system to best utilize the power of a blower. This can be achieved by minimizing the changes in direction of airflow within a cook top down draft system. Using the 90-degree change within the tangential occurs by positioning the blower where the airflow is required to make a 90-degree turn. A 180-degree flow of air can be designed such that the air is drawn in to the cross-flow tangential wheel and exits by going straight through. Funneling of the discharged air should be avoided. This is best done by reducing the discharge closest to the wheel rather than to slowly reduce the discharge area. For example, having the opening for exhausting at less than 0.45 times the diameter causes problems and having restricted or tapered flowing out the end results in back pressure and reduced blower efficiency.

Figure 29:
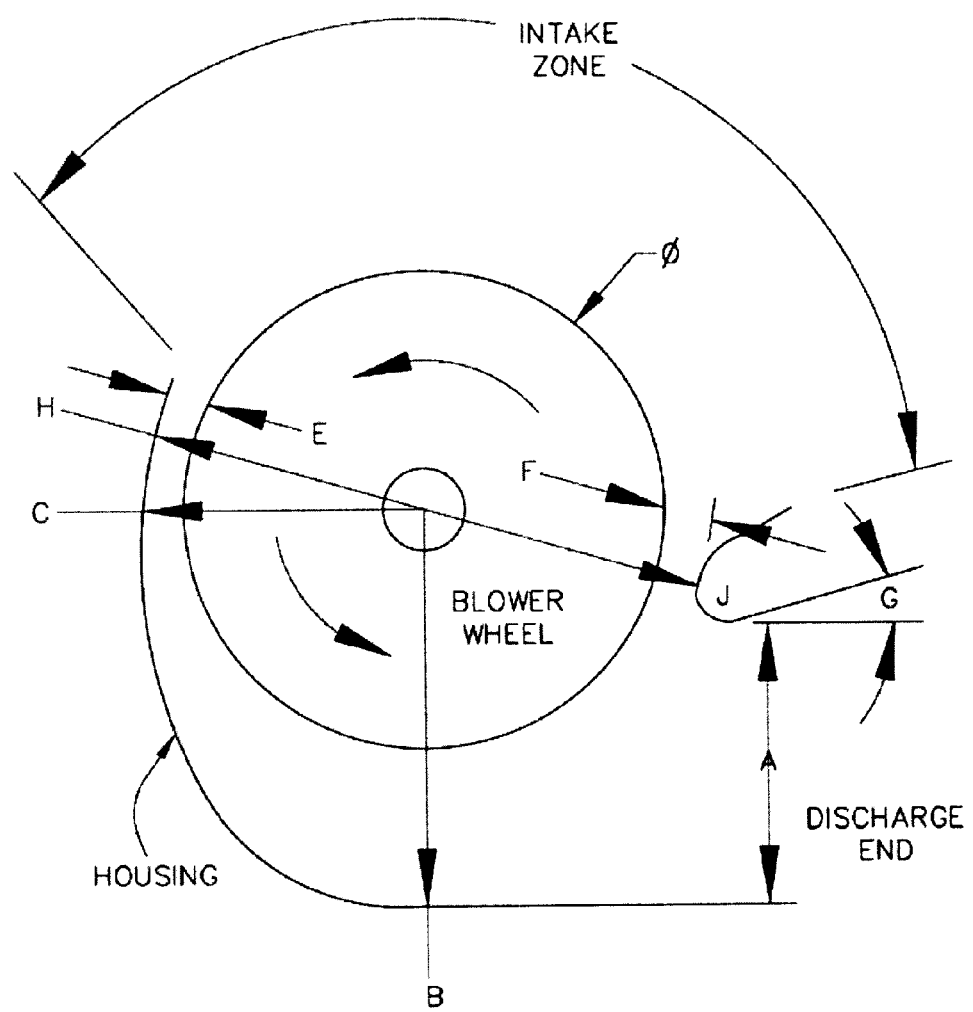
FIG. 29 shows a blower housing according to one aspect of the present invention.

Thus, housing design is critical in blower performance. As best shown in FIG. 29, the preferred housing design includes: For optimum CFM, A=0.60φ, B=0.85φ, C=0.60φ, E=F=0.07φ, G=15 deg, and HIJ should be a straight line. If a smaller outlet is necessary, it is better to reduce A first to a minimum of 0.45φ, then A and B together rather than tapering the outlet. Air will discharge following the 15 degree upward. If this is not desirable, for maximum discharge, the entire housing must be rotated-G should not be reduced. Reducing A will affect CFM, but not air speed. For noise control, dimensions E and F are critical, with F being the most critical. Reducing both E and F will increase CFM and noise level. When using grills at discharge, the CFM will be directly reduced by the percent of area covered if the blower maintains the same wheel speed. For the cook top down draft application when the motor runs below its maximum speed: when static of any kind is applied to the system at the discharge, the wheel will speed up to try and maintain the same CFM up to the maximum speed of the motor. This is a useful design feature that is used in this application where static might build with time (as contamination in a filter). If the initial motor is designed to run below its maximum speed, this leaves room for the motor to speed up and maintain its performance.

Referring again to FIG. 28, the housing 450 used for the crossflow/tangential impeller wheel 444 has galvanized steel for end plates 452 and two parts to produce vortex baffle 470 and scroll. Alternatively, aluminum could be used for less weight as could stainless steel or steel painted. The impeller used in the down draft appliance is aluminum for lightweight and thus a lower horsepower motor would be required to drive the blower. But galvanized steel, stainless steel or steel painted can be used but require a larger motor 453 to drive these designs due to the added weight. These heavy weight materials also provide other benefits such as stronger blades, which can run at higher speeds, chemical resistance, and better aesthetics. The blower wheel blades 460 are preferably made of lightweight and strong materials also. The wheel 444 is mounted in the housing 450 on shafts 465a, b, which are mounted on bearings 469 on one end and a motor 453 on the other.

The following formulae represent the preferred optimum operational design criteria of the blower wheel.

For specified wheel dimensions, a change in speed will optimize the system:

$$N_{new} = N_{old} \times \left(\frac{CFM_{new}}{CFM_{old}}\right)$$

Resulting in:

$$HP_{new} = HP_{old} \times \left(\frac{N_{new}}{N_{old}}\right)^3$$

$$SP_{new} = SP_{old} \times \left(\frac{N_{new}}{N_{old}}\right)^2$$

If the static pressure is acceptable, wheel length can be optimized (while other conditions remain constant):

$$L_{new} = L_{old} \times \left(\frac{CFM_{new}}{CFM_{old}}\right)$$

Resulting in:

$$HP_{new} = HP_{old} \times \left(\frac{new}{old}\right)$$

If the static pressure is not acceptable, wheel diameter must be resized using:

$$SP_{new} = SP_{old} \times \left(\frac{D_{new}}{D_{old}}\right)^2$$

Resulting in:

$$CFM_{new} = CFM_{old} \times \left(\frac{D_{new}}{D_{old}}\right)^3$$

$$HP_{new} = HP_{old} \times \left(\frac{D_{new}}{D_{old}}\right)^5$$

Where:
N=Speed
   (Revolutions per minute)
CFM=Volume
   (Cubic Feet per minute)
HP=Horsepower
SP=Static Pressure
   (inches of water)
L=Wheel Length
   (inches)
D=Wheel Diameter
   (inches)

The below illustrate examples of preferred embodiments of the present invention:

| Wheal Diameter | Housing Dimensions | | | | |
|---|---|---|---|---|---|
| | A | B | C | D | E |
| 4" | 6.25" | 6.00" | 2.70" | 2.24" | 1.30" |
| 4.5" | 6.65" | 6.50" | 3.00" | 2.50" | 1.25" |
| 5" | 7.15" | 7.25" | 3.12" | 3.02" | 1.91" |
| 5.5" | 7.63" | 8.00" | 3.45" | 3.50" | 2.15" |
| 6" | 8.00" | 8.75" | 3.90" | 3.75" | 1.80" |
| 8" | 10.00" | 11.50" | 5.00" | 5.40" | 3.25" |

| Diameters available (inches) | Number of Blades |
|---|---|
| 4" | 29 blades |
| 4.5" | 30 blades |
| 5" | 36 blades |
| 5.5" | 36 blades |
| 6" | 3b blades |
| 8" | 52 blades |

TABLE 3

CFM for different sized cross-flow/tangential wheels at zero static pressure and 1625 RPM. Additionally, see FIGS. 31 and 32 for CFM rating comparisons of different size wheels.

| | Sample Wheel Length (in.) | | | | | | | | Static Pressure (in.) Maximum |
|---|---|---|---|---|---|---|---|---|---|
| Wheel Dia.(in) | 10 | 15 | 20 | 25 | 30 | 35 | 40 | 45 | at 1750 rpm |
| 4 | 350 | 525 | 700 | 875 | 1050 | n/a | n/a | n/a | 0.18 |
| 4.5 | 500 | 750 | 1000 | 1250 | 1500 | 1750 | n/a | n/a | 0.23 |
| 5 | 650 | 1000 | 1325 | 1650 | 2000 | 2325 | 2675 | n/a | 0.45 |
| 5.5 | 900 | 1350 | 1775 | 2200 | 2650 | 3100 | 3550 | n/a | 0.57 |
| 6 | | 1400 | 1900 | 2350 | 2800 | 3300 | 3750 | 4225 | 0.65 |
| 8 | | 3350 | 4500 | 5550 | 6700 | 7800 | 8900 | 1000 | 1.10 |

Table 3—CFM for different sized cross-flow/tangential wheels at zero static pressure and 1625 RPM. Additionally, see FIGS. 31 and 32 for CFM rating comparisons of different size wheels.

In sum, the advantages of using a cross-flow/tangential blower are generally as follows:

Uniform, extended airflow over large surfaces,

Space-saving installation due to 90 degrees airflow pattern or 180 degrees air flow, Fan length can be matched to appliance width (note: airflow conditions remain the same even for wider appliances, i.e., there is a simplified design and drafting in case of modular systems), Quieter operation due to flow-inducing impeller and housing design, Longer working life due to the robust design and location of bearings away from the hot air zone, Works equally well in any arrangement, e.g., right or left hand drives, Dynamically balanced to minimize noise and vibration, High performance with low noise and low electricity consumption, Long, narrow air flow path for very efficient cooling, and Easier to install.

Other features may be added to the conventional cross-flow blower to further increase the effectiveness, e.g., a heavy duty double-ball bearing motor, an aluminum impeller, and self-lubricating sleeve bearings. Further, a tangential fan with c-frame shade pole motor may be used as it can better withstand hot air exhaust.

There are virtually innumerable uses for the present invention, all of which need not be detailed here. For example, the cook top disclosed herein may be used in a side-to-side, back-to-back, or other configuration for serving as part of a larger, expandable cooking area. Of course, this and all of the other disclosed embodiments can be practiced without undue experimentation.

Although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept. In addition, the individual components need not be fabricated from the disclosed materials, but could be fabricated from virtually any suitable materials. For example, construction materials for the cook top, the downdraft, and blower are at least one of: metal, glass, stone, a transparent material, tile, plastic, and manmade material.

Other features may be added to the conventional cross-flow blower to further increase the effectiveness, e.g., a heavy duty double-ball bearing motor, an aluminum impeller, and self-lubricating sleeve bearings. Further, a tangential fan with c-frame shade pole motor may be used as it can better withstand hot air exhaust.

Moreover, the individual components need not be formed in the disclosed shapes, or assembled in the disclosed configuration, but could be provided in virtually any shape, and assembled in virtually any configuration. Further, although various components as described herein as physically separate modules, it will be manifest that they may be integrated into the apparatus with which they are associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. An induction cook top appliance comprising:
   a housing;
   a cooking surface having at least one bracket connected to a bottom side of the cooking surface to attach the cooking surface to the housing;
   an induction coil in the housing and below the cooking surface;
   an induction generator operatively connected to the induction coil;
   a cooling device comprising a closed loop temperature controller providing at least one signal to a thermoelectric device to regulate the temperature within the housing, wherein the thermoelectric device is sized to provide sufficient cooling within the housing such that no venting is required within the housing; and
   a separate electronic control system in communication with the cooling device, wherein the cooling device is the thermoelectric device having a first side mounted within the housing and a second side mounted outside the housing;
   a plurality of bosses extending into the housing toward a metal plate, the plurality of bosses generally spaced around the periphery of the housing and engaging the metal plate such that an air gap between the housing and the metal plate is formed between successive bosses; and wherein
   the thermoelectric device is a solid-state heat pump that utilizes the Peltier effect to provide cooling.

2. The induction cook top appliance of claim 1 further comprising:
   at least one additional induction coil in the housing and below the cooking surface; and
   at least one additional induction generator, each additional induction generator operatively connected to one of the additional induction coils, wherein each induction coil and induction generator are packaged in an induction unit assembly and wherein the cooling device comprises a fan operably connected to an induction unit assembly.

3. A cook top appliance comprising:
   a housing having an upper surface, a lower surface, and a plurality of side surfaces, wherein at least one bracket is affixed to the upper surface to connect the upper surface to the plurality of side surfaces, wherein the housing comprises a frame member configured to fit under a glass cooking surface and on top of a counter top, and wherein the frame member has a plurality of vents to communicate air movement through at least of a back of the induction cook top, a left side of the induction cook top, and a right side of the induction cook top; wherein a cooling device is a fan located at a bottom of the induction cook for drawing air into the cook top and circulating the air within the cook top; and further comprising air holes which are below the induction cook top and the counter top;
   a touchpad controller operably connected to the upper surface;
   a plurality of surfaces arranged on the upper surface of the housing;
   a plurality of heating elements, each heating element positioned below one of the cooking surfaces;
   a metal plate extending generally parallel to the upper surface and substantially between each of the side surfaces configured to support the heating elements;
   an insulation layer positioned below the metal plate and extending substantially between each of the side surfaces;
   a fan connected to a lower surface of the metal plate;

a fan cover extending below the lower surface and extending generally around a periphery of an air intake, the air intake extending through the lower surface;

a gasket extending substantially around the periphery of the air intake; and a plurality of bosses protruding into the housing from the plurality of side surfaces at a height on the side surfaces generally in line with the metal plate.

4. The cook top appliance of claim 3, further comprising:

a regulator to control electrical current to each of the heating elements such that a power output can be changed as needed.

5. The induction cook top appliance of claim 3 further comprising a forced convection cooler, an electronic heat sink, a thermoelectric cooling device, a cold plate, a copper spreader, a plurality of electronic heat pipes, and a plurality of thermal vias.

6. The induction cook top appliance of claim 3 wherein the fan is in air flow communication with the plurality of vents and configured to draw air across the heating elements.

7. The induction cook top appliance of claim 3 wherein the fan is operably connected such that air is generally drawn into the base through an opening in the lower surface and expelled out through the vent in the side of the base.

\* \* \* \* \*